US008606678B2

(12) United States Patent
Jackowitz et al.

(10) Patent No.: US 8,606,678 B2
(45) Date of Patent: Dec. 10, 2013

(54) INTERACTIVE AND COLLABORATIVE FINANCIAL CUSTOMER EXPERIENCE APPLICATION

(75) Inventors: Kenneth S. Jackowitz, Charlotte, NC (US); Stefani Benefield, Pace, FL (US)

(73) Assignee: Bank of America Corporation, Charlotte, NC (US)

( * ) Notice: Subject to any disclaimer, the term of this patent is extended or adjusted under 35 U.S.C. 154(b) by 741 days.

(21) Appl. No.: 12/359,887

(22) Filed: Jan. 26, 2009

(65) Prior Publication Data

US 2010/0094774 A1 Apr. 15, 2010

Related U.S. Application Data

(60) Provisional application No. 61/105,700, filed on Oct. 15, 2008.

(51) Int. Cl.
*G06Q 40/00* (2012.01)
(52) U.S. Cl.
USPC ............... 705/36 R; 705/4; 705/7.32; 705/38; 705/42; 705/14; 705/7.22; 707/732; 345/473; 709/223
(58) Field of Classification Search
USPC ............... 705/36 R, 42, 7.32, 4, 38, 14, 7.22; 709/223; 707/732; 345/473
See application file for complete search history.

(56) References Cited

U.S. PATENT DOCUMENTS

| | | | | |
|---|---|---|---|---|
| 6,601,044 | B1* | 7/2003 | Wallman | 705/36 R |
| 2004/0054610 | A1* | 3/2004 | Amstutz et al. | 705/36 |
| 2007/0192457 | A1* | 8/2007 | Ervin | 709/223 |
| 2008/0091459 | A1* | 4/2008 | Elgar et al. | 705/1 |
| 2009/0055327 | A1* | 2/2009 | Jones et al. | 705/36 R |

OTHER PUBLICATIONS

Extended European Search Report dated Jan. 29, 2010 for European Patent Application No. EP 09 25 2414.

* cited by examiner

*Primary Examiner* — Harish T Dass
(74) *Attorney, Agent, or Firm* — Michael A. Springs; Moore & Van Allen, PLLC; James C. Edwards

(57) ABSTRACT

Systems, methods, and computer program products are provided for an interactive financial customer experience that allows collaboratively selecting financial products for a customer. The customer experience assesses the customer's life events and subsequently uses the life events and the proximate date of occurrence of the life events to determine financial product recommendations and offers for the customer. Additionally, the customer experience may assess the customer's life interests and/or financial portfolio to further determine financial product recommendations and offers. The financial product recommendations, along with other financial product options, may be presented to the customer and financial institution associate in a user-friendly platform that further accentuates the collaborative nature of the financial product selection process.

21 Claims, 30 Drawing Sheets

US 8,606,678 B2

INTERACTIVE AND COLLABORATIVE FINANCIAL CUSTOMER EXPERIENCE APPLICATION

FIELD

In general, embodiments herein disclosed relate to systems, methods, and computer program products for providing an interactive and collaborative customer experience that determines financial product recommendations based at least on captured customer life events in a timeline platform.

BACKGROUND

Financial institutions, such as banks and the like, not unlike other businesses, are highly concerned with customer satisfaction. In this regard, the experiences that the customer encounters when interfacing with the financial institution shape the customer's perceptions and attitudes toward the bank, which, in turn, may influence the customer's tendency to do business with the bank or increase the volume of business with the bank.

Paramount to the issue of customer perception is the experience that a customer encounters when initially visiting a financially institution to inquire about available products and/or services or open accounts. Traditionally, the initial encounter has been provided in an environment whereby the financial associate or personal banker sits at desk, queries the customer with multiple personal questions, inputs the answers to the queries in a personal computer, which, in turn, returns financial product and/or service options to the customer. The personal banker then explains the options or recommendations to the customer as a means of marketing what the bank may have to offer the customer.

Unfortunately, this traditional dynamic for providing financial product/service recommendations and explaining product/service options is, in most instances, not viewed as a highly collaborative effort between the customer and the banking associate. Other than answering the questions posed by the banking associate during the initial interview process, many of which are limited to questions concerning the customer's current financial portfolio, the involvement of the customer in the recommendation process is limited.

If the initial exposure by the customer to the bank is made more of a collaborative effort and involves more insight into the customer's current, as well as long-term financial needs, more trust can be established at the onset of the relationship between the customer and the financial institution. Not unlike other business or personal relationships, by establishing trust from the onset the customer is more apt to seek additional financial products and services in the future.

Additionally, traditional financial product/service interaction between customers and banks is limited in the type of information that is acquired from the customer and, in turn, used to make financial product/service recommendations. In many instances, the information that is relied on to make financial product/service recommendations is related to the current customer's financial portfolio. The problem with solely relying on customer financial portfolios is two-fold. First, a customer may be reluctant to be forthright with divulging all of their current financial assets and/or debts, in which case, the bank is left to make financial product/service recommendations or offers based on inaccurate information. Moreover, by relying solely on financial portfolio information, the recommendations and offers afforded the customer do not account for future foreseen events in the customer's lifetime that may have an impact on the financial products/services that are currently of value to the customer or may have value in the future.

Therefore, a need exists to develop methods, systems, computer program products and the like which provide for an interactive and collaborative customer experience that results in financial product recommendations and selection by the customer of the same. The collaborative nature of the customer experience should be one that results in establishing trust between the customer and the financial institution. In addition, the collaborative nature of the customer experience should rely on more than financial portfolio information in determining customer needs and, hence, financial product/services recommendations.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

Methods, systems and computer program products are defined that provide for an interactive and collaborative customer experience for marketing financial products to customers. According to one embodiment of the present invention, the customer defines life events and associates a proximate date or date range in which the event is likely to occur, and based on the life events and associated dates, the system is able to determine financial solution recommendations in the form of suggested financial products and/or services (it should be noted that the term "financial products", as used herein, encompasses both financial products and financial services). In alternate aspects, the customer may additionally define life interests and financial portfolio information, which may also be used to determine financial product recommendations. Based on the financial product recommendations and other financial product options afforded to the customer, the customer, in collaboration with a financial institution representative, can customize a set of financial products and services that best fit the needs of the customer in terms of foreseen life events, life interests and/or current financial status.

According to one embodiment of the present invention, a method is defined for providing financial product recommendations on a computing device. The method includes receiving first user inputs that each defines a life event associated with a customer and an associated proximate date of occurrence for each of the life events. In one embodiment, the first user inputs involve associating each life event with a position on a timeline. The method additionally includes determining financial product recommendations for the customer based at least in part on the life events and the associated proximate date of occurrence for each of the life events and providing a user interface that includes the financial product recommendations.

Additionally, the method may optionally include receiving second user inputs that define information related to the customer's financial portfolio. In such embodiments, determining the financial product recommendations may further include determining the financial product recommendations based at least in part on the life events, the associated proximate date of occurrence for each life event and the information related to the customer's financial portfolio.

In another alternate embodiment, the method may include receiving second user inputs that define the customer's life interests. In such embodiments, determining the financial product recommendations may further include determining the financial product recommendations based at least in part on the life events, the associated proximate date of occurrence for each life event and the customer's life interests. For example, the defined life interests may be used to determine affinity financial product recommendations, such as affinity credit cards, affinity debit cards, affinity checking accounts or the like.

In another alternate embodiment, the method may include receiving second user inputs that define information related to the customer's financial portfolio and third user inputs that define the customer's life interests. In such embodiments, determining the financial product recommendations may further include determining the financial product recommendations based at least in part on the life events, the associated proximate date of occurrence for each life event and at least one of the customer's life interests or the customer's financial portfolio information.

In optional embodiments of the method, providing the user interface may additionally include providing the user interface that includes financial product options, in addition to the financial product recommendations. In such embodiments, the method may additionally include receiving second user inputs that customize the customer's selection of financial products based on the financial product recommendations and the additional financial product options. In other alternate embodiments, providing the user interface may further include providing access to networked multi-media demonstrations and/or tutorials such that each demonstration or tutorial is related to a financial product or an option related to a financial product.

In other optional embodiments, the method may include storing the life events associated with a customer and the associated proximate date of occurrence for each of the life events in a customer profile database. In such embodiments, the method may include re-evaluating customer financial product needs over time based on the stored life events and associated proximate date of occurrence for each of the life events.

Yet another embodiment of the invention is defined by a system for providing financial product recommendations. The system includes a computing device including a computing platform having at least one processor and a memory in communication with the processor. The computing device also includes a customer experience module stored in the memory and executable by the processor. The customer experience module includes a life events user interface routine operable to provide a life event user interface that is operable to receive first user inputs that define life events and associate the life events with a proximate life event occurrence date. The customer experience module also includes a financial product recommendation user interface routine operable to provide a financial product recommendation user interface that is operable to provide financial product recommendations based on the life events and associated proximate life event occurrence date. The system also includes a customer financial product recommendation module in communication with the customer experience module. The customer financial product recommendation module is operable determine one or more financial product recommendations based at least in part on the inputted life events and associated proximate life event occurrence date and communicate the financial product recommendations to the financial product recommendation and customization user interface routine.

In one embodiment of the system, the customer experience module may further include a financial portfolio user interface routine operable to provide a financial portfolio user interface that is operable to receive second user inputs that define customer financial portfolio data. In such embodiments, the customer financial product recommendation module may be further operable to determine the one or more financial product recommendations based at least in part on the inputted life events, the associated proximate life event occurrence date and the inputted customer financial portfolio data.

In other embodiments of the system, the customer experience module may further include a life interest user interface routine operable to provide a life interest user interface that is operable to receive second user inputs that define customer life interests. In such embodiments, the customer financial product recommendation module may be further operable to determine the one or more financial product recommendations based at least in part on the inputted life events, the associated proximate life event occurrence date and the inputted customer life interests. Further, the customer financial product recommendation module may be further operable to determine one or more affinity financial product recommendations based on the inputted customer life interests.

In still further embodiment of the system, the customer experience module further includes a financial portfolio user interface routine operable to provide a financial portfolio user interface that is operable to receive second user inputs that define customer financial portfolio data and a life interest user interface routine operable to provide a life interest user interface that is operable to receive third user inputs that define customer life interests. In such embodiments, the customer financial product recommendation module may be further operable to determine the one or more financial product recommendations based at least in part on the inputted life events, the associated proximate life event occurrence date, the inputted customer financial portfolio data and the inputted customer life interests.

In optional embodiments, the system may also include a customer database that stores a plurality of customer profiles. The database is operable to receive the life events and the associated proximate life event occurrence date from the customer experience module and store the life events and the associated proximate life occurrence date in an associated customer profile.

In other optional embodiments of the system, the financial product recommendation user interface routine is further defined as a financial product recommendation and customization user interface routine operable to provide a financial product recommendation and customization user interface that is further operable to provide the user the ability to customize a financial product package that includes one or more financial products.

A computer program product provides for another embodiment of the invention. The computer program product includes a computer-readable medium. The medium includes a first set of codes for causing a computer to receive first user inputs that each defines a life event associated with a customer and an associated proximate date of occurrence for each of the life events. The medium further includes a second set of codes for causing a computer to determine one or more financial product recommendations for the customer based at least in part on the life events and the associated proximate date of occurrence for each of the life events. Additionally the medium includes a third set of codes for causing a computer to provide a user interface that includes the one or more financial product recommendations.

In alternate embodiments of the computer program product, the medium may include a fourth set of codes for causing a computer to receive one or more second user inputs that define information related to the customer's financial portfolio. In such embodiments, the second set of codes may further causes the computer to determine the one or more financial product recommendations based at least in part on the life events, the associated proximate date of occurrence for each life event and the information related to the customer's financial portfolio.

In other alternate embodiments of the computer program product, the medium may include a fourth set of codes for causing the computer to receive one or more second user inputs that define the customer's life interests. In such embodiments, the second set of codes may further cause the computer to determine the one or more financial product recommendations based at least in part on the life events, the associated proximate date of occurrence for each life event and the customer's life interests. Further, the second set of codes may cause the computer to determine one or more affinity financial product recommendations based on the customer's life interests.

In still further alternate embodiments of the computer program product, the medium may include a fourth set of codes for causing a computer to receive one or more second user inputs that define information related to the customer's financial portfolio and a fifth set of codes for causing the computer to receive one or more second user inputs that define the customer's life interests. In such embodiments, the second set of codes is may further cause the computer to determine the one or more financial product recommendations based at least in part on the life events, the associated proximate date of occurrence for each life event and at least one of the customer's financial portfolio or a customer's life interests.

In optional embodiments of the computer program product, the third set of codes may further cause the computer to provide the user interface that includes one or more additional financial product options. In such embodiments, the medium may include a fourth set of codes for causing the computer to receive one or more second user inputs that customize the customer selection of financial products based on the one or more financial product recommendations and the one or more additional financial product options.

A method providing a financial customer experience on a computing device defines yet another embodiment of the invention. The method includes providing a first user interface that is operable to receive first user inputs that define a customer's life events and associate each life event with a proximate date of occurrence and providing a second user interface that is operable to receive second user inputs that define the customer's life interests. The method also includes providing a third user interface that is operable to receive third user inputs that define the customer's financial portfolio and providing a fourth user interface that is operable to present financial product recommendations based on at least one of the first, second or third user inputs. The fourth user interface is also operable to receive fourth user inputs that customize the customer's selection of one or more financial products based on the financial product recommendations and one or more financial products options. In optional embodiments of the method, the first, second, third and fourth user interfaces on a multi-touch screen.

In other optional embodiments of the method, the first user interface is configured with a timeline such that tags representing life events are movable to different locations within the timeline to represent the proximate date of the occurrence of the life event. In still further optional embodiments of the method, the second user interface is configured with a catalog of life interest categories, such that selection of a life interest category provides for display of one or more associated life interest items and selection of one or more life interest item defines a customer's life interests. In other optional embodiments of the method, the third user interface is configured with a catalog of financial institutions cards, wherein each financial institution card provides for the customer to define proximate values of asset accounts and liability accounts associated with a financial institution.

A method for financial product re-assessment defines yet another embodiment of the invention. The method comprises capturing first data related to one or more customer life events and an associated proximate date of occurrence for each of the life events and storing the first data in a profile associated with the customer. The method further comprises setting triggers in the profile that are operable to communicate an automated alert to a financial institution that a customer life event is imminent based on the associated proximate date of occurrence. Additionally, the method includes contacting the customer based on receipt of the alert by the financial institution. The contact is for the purpose of re-assessing the customer's current financial products in view of the imminent customer life event.

In optional embodiments the method may further include capturing second data related to the customer's financial portfolio and storing the second data in the profile associated with the customer. In such embodiments, contacting the customer further comprises contacting the customer for the purpose of offering the customer financial products based on the imminent customer life event and the customer's financial portfolio.

In other optional embodiment the method may include capturing second data related to the customer's life interests and storing the second data in the profile associated with the customer. In such embodiments, contacting the customer further comprises contacting the customer for the purpose of offering the customer financial products based on the imminent customer life event and the customer's financial portfolio.

In still further optional embodiments the method may include capturing second data related to the customer's financial portfolio and third data related to the customer's life interests and storing the second and third data in the profile associated with the customer. In such embodiments, contacting the customer further comprises contacting the customer for the purpose of offering the customer financial products based on the imminent customer life event and at least one of the customer's financial portfolio or the customer's life interests.

Thus, present embodiments include systems, methods, and computer program products that provide for an interactive financial customer experience that allows collaboratively selecting financial products for a customer. The customer experience assesses the customer's life events and subsequently uses the life events and the proximate date of occurrence of the life events to determine financial product recommendations and offers for the customer. Additionally, the customer experience may assess the customer's life interests and/or financial portfolio to further determine financial product recommendations and offers. The financial product recommendations, along with other financial product options, may be presented to the customer and financial institution associate in a user-friendly platform that further accentuates the collaborative nature of the financial product selection process.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
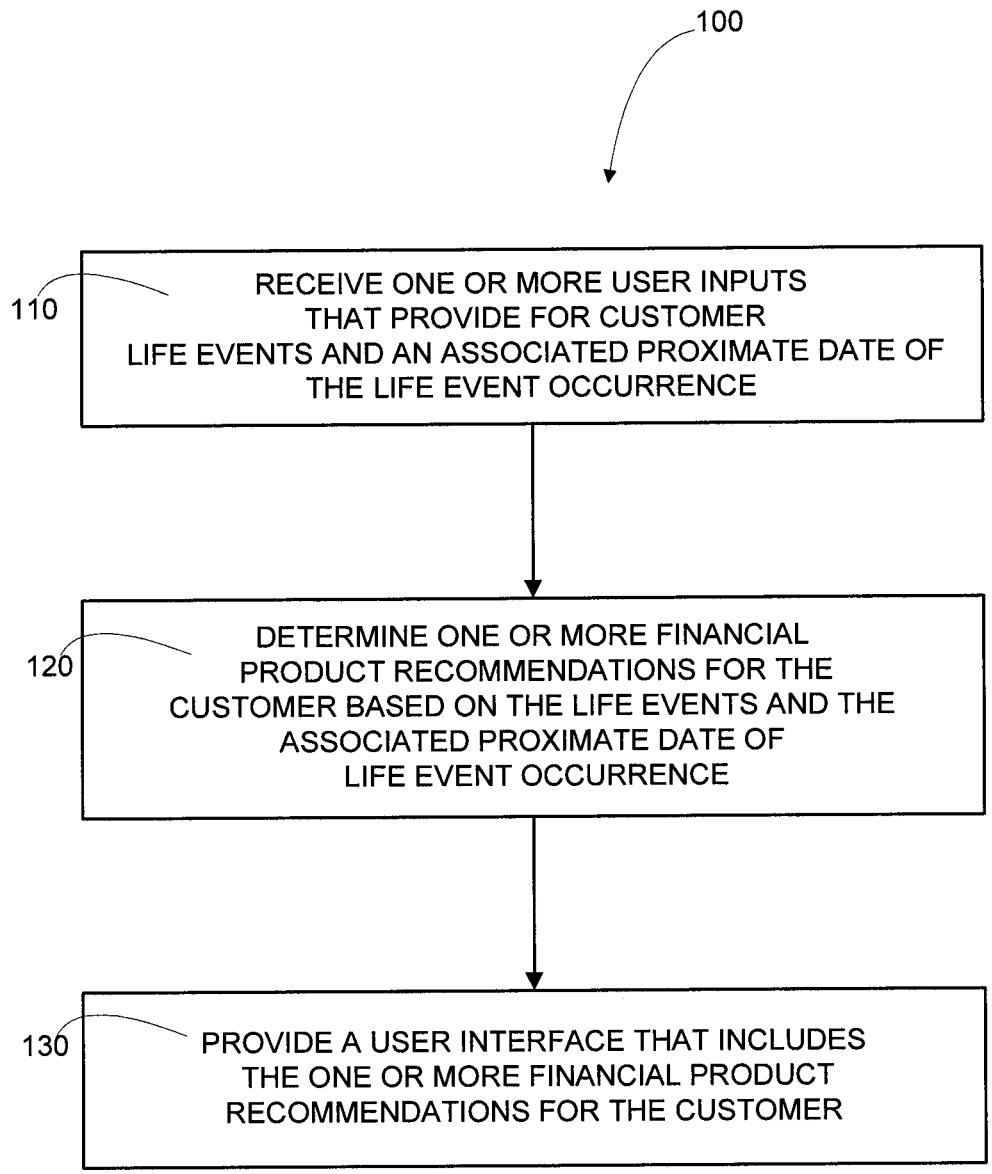
Figure 2:
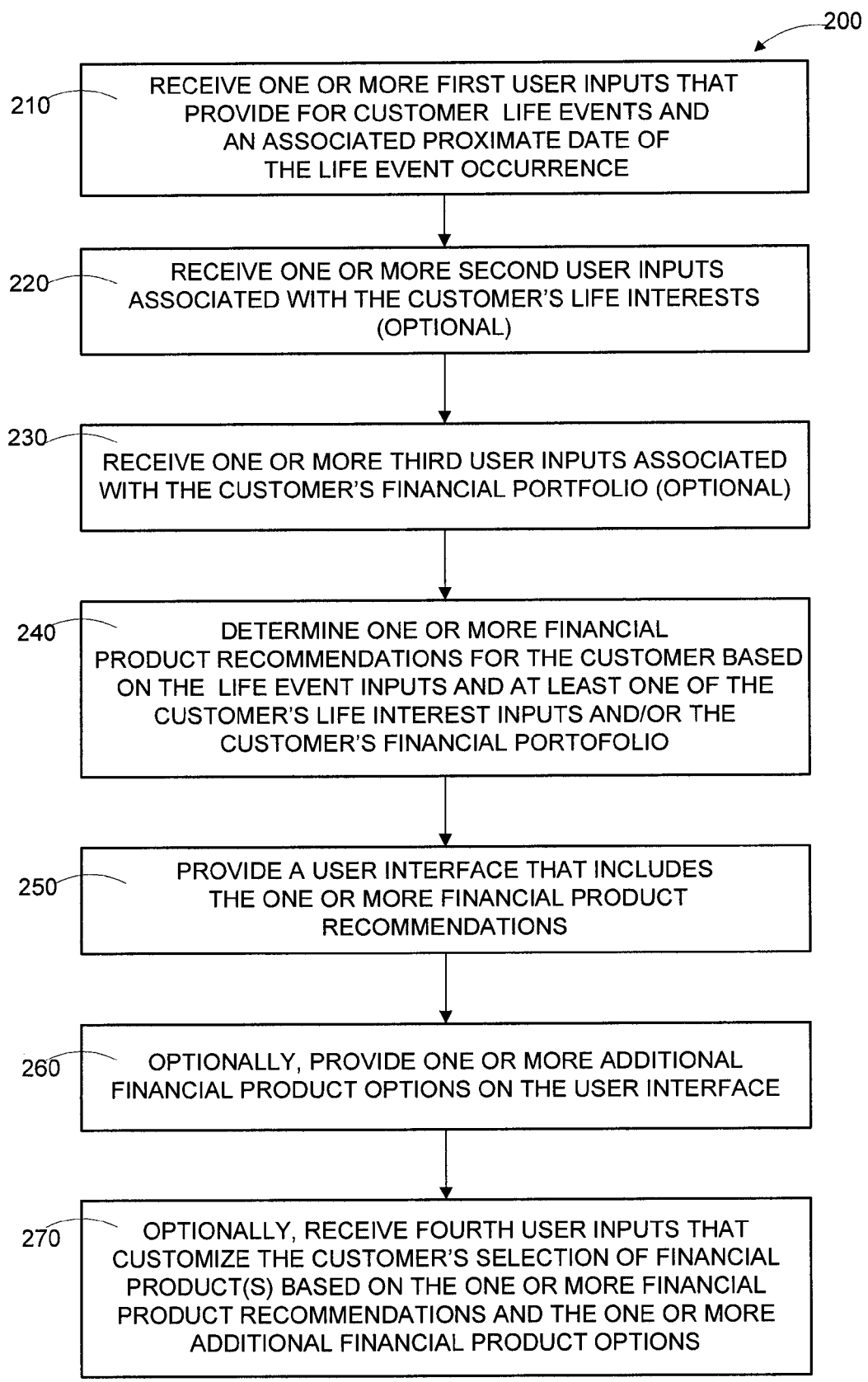
Figure 3:
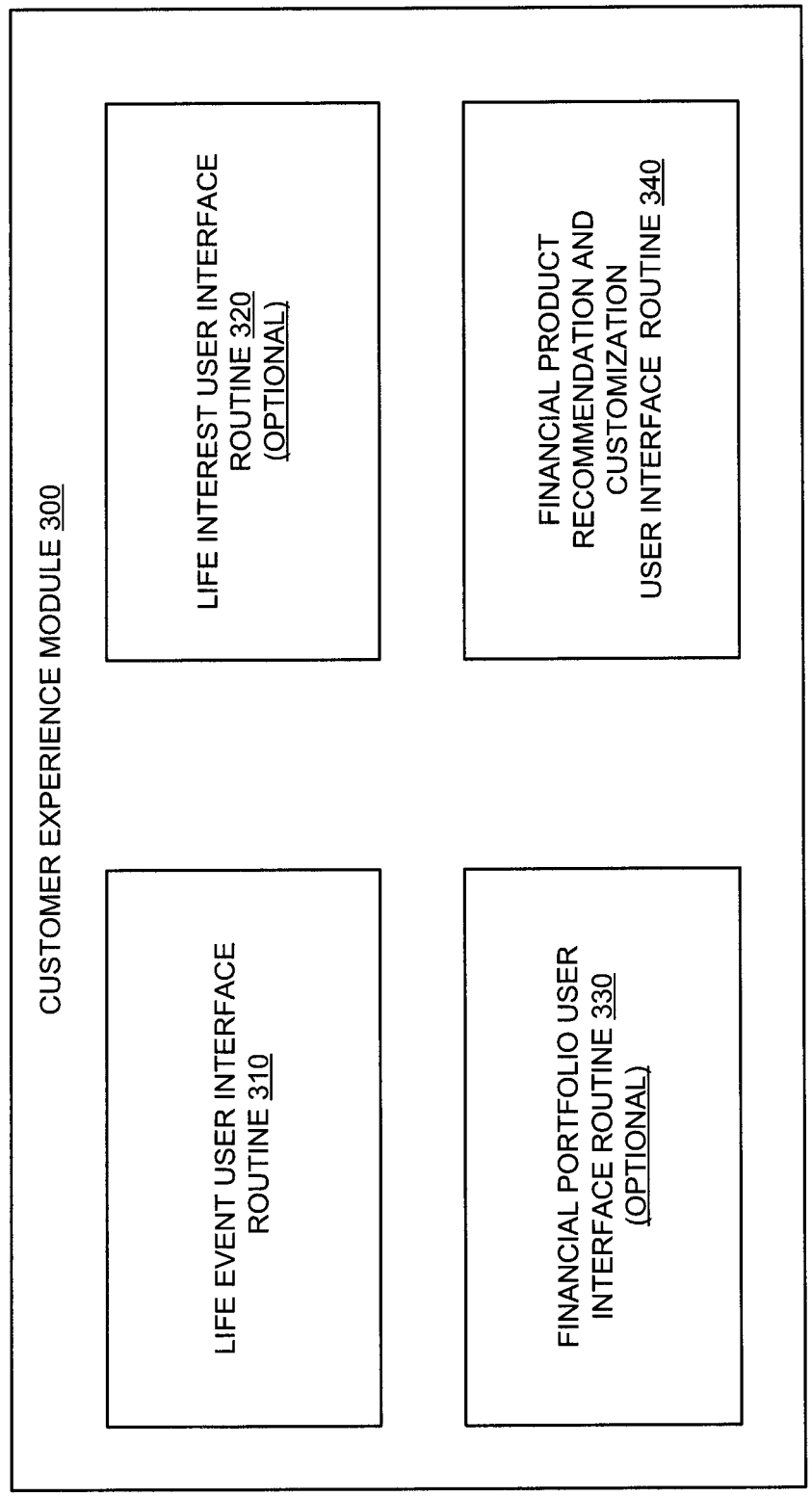
Figure 4:
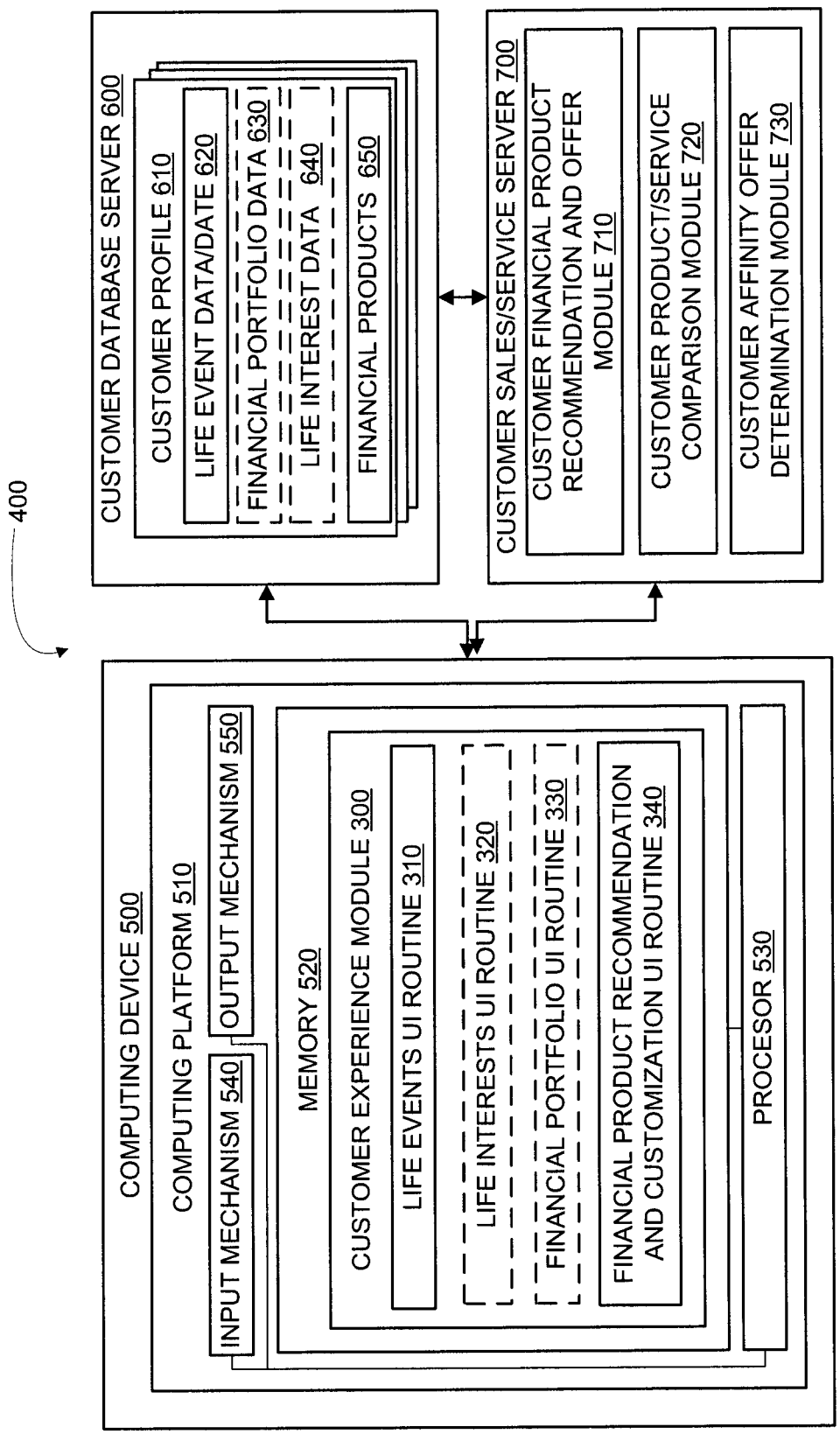
Figure 5:
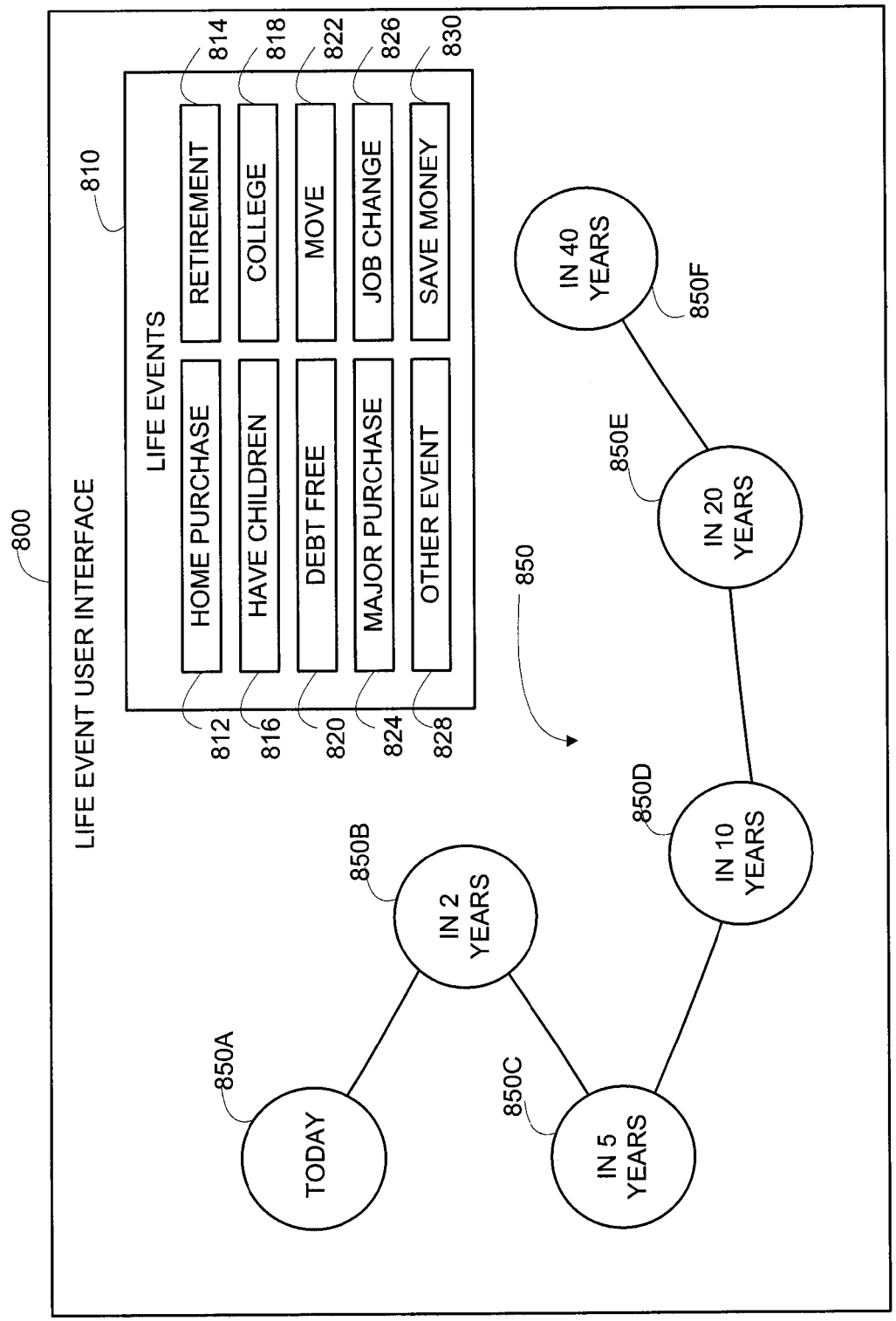
Figure 6:
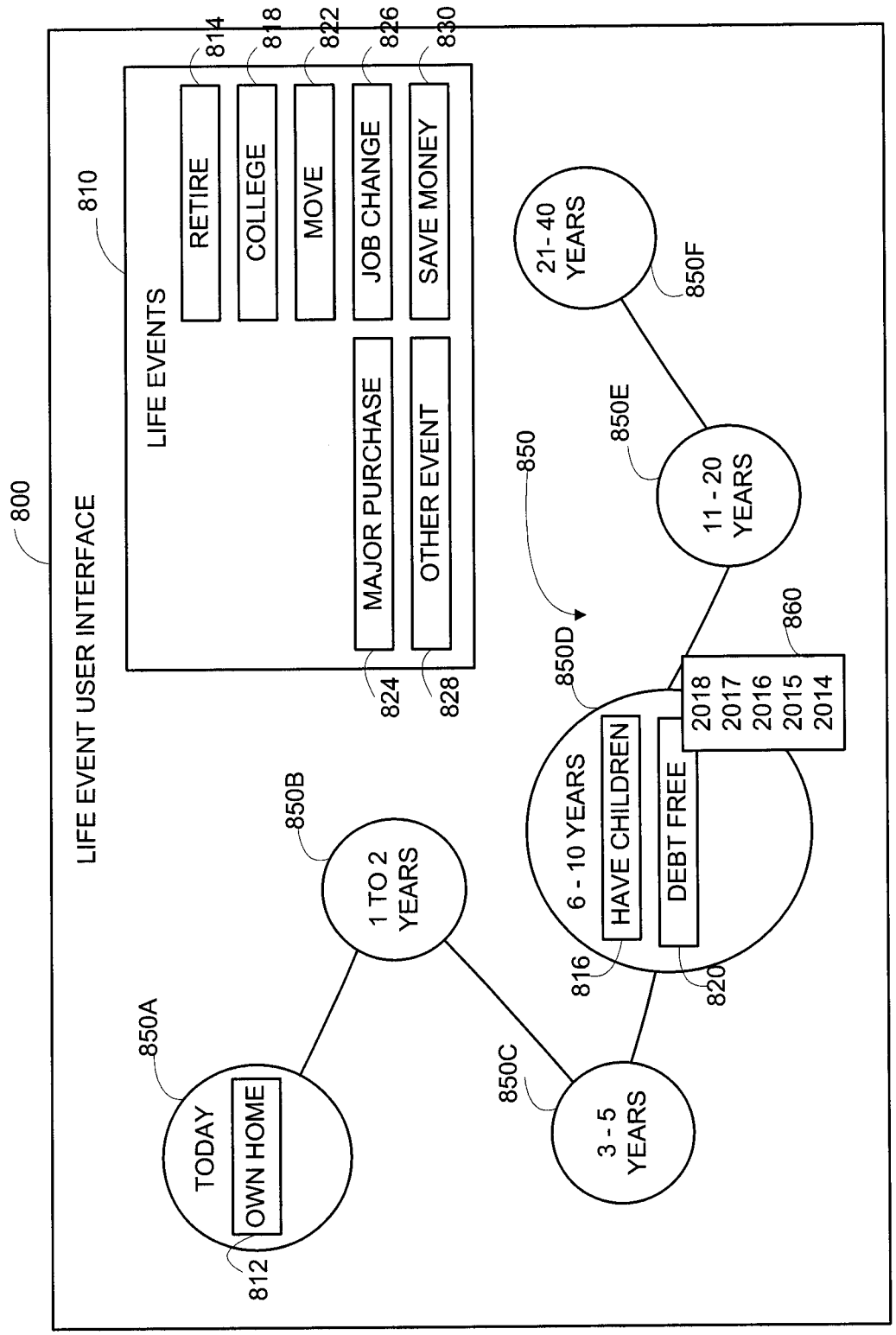
Figure 7:
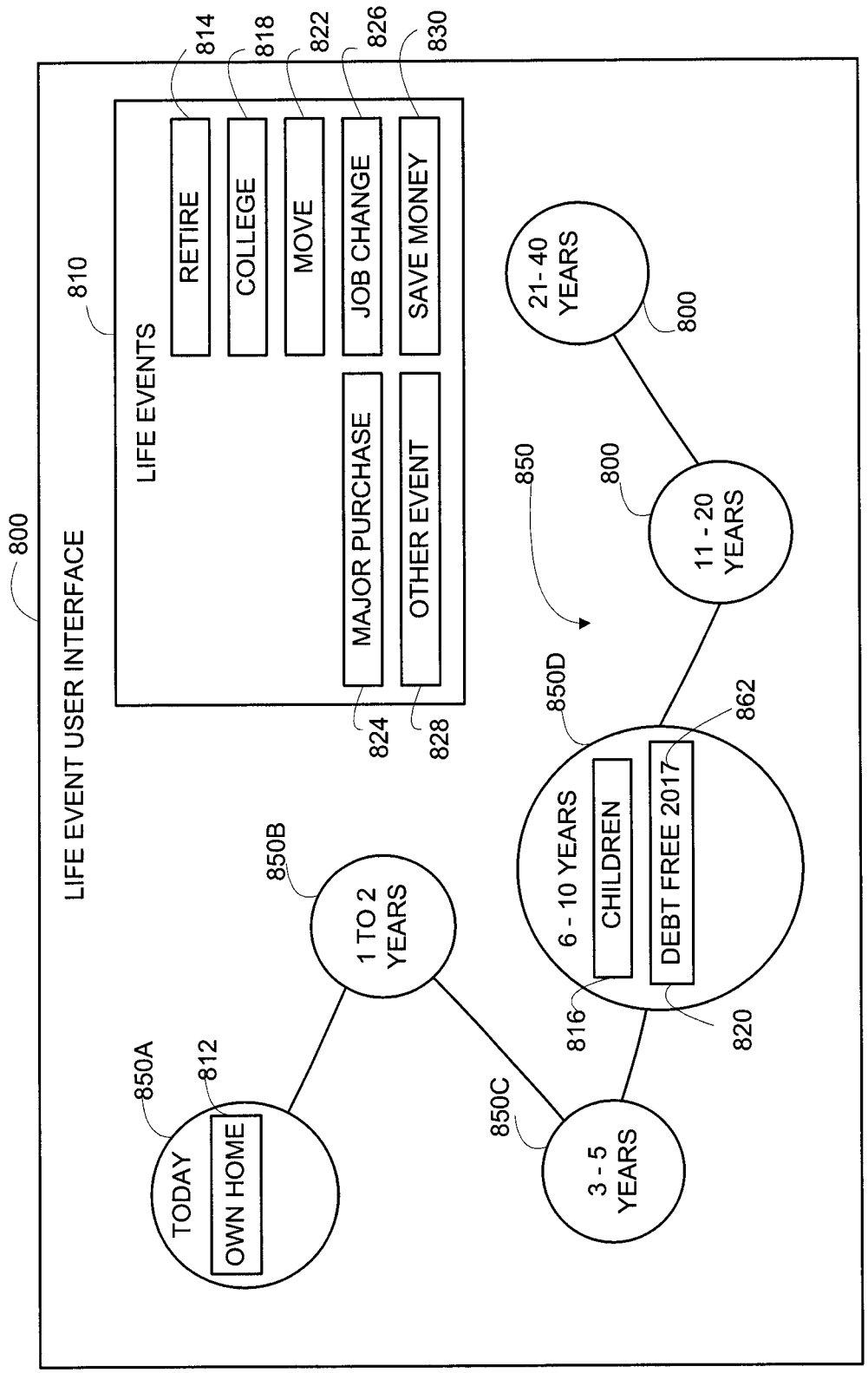
Figure 8:
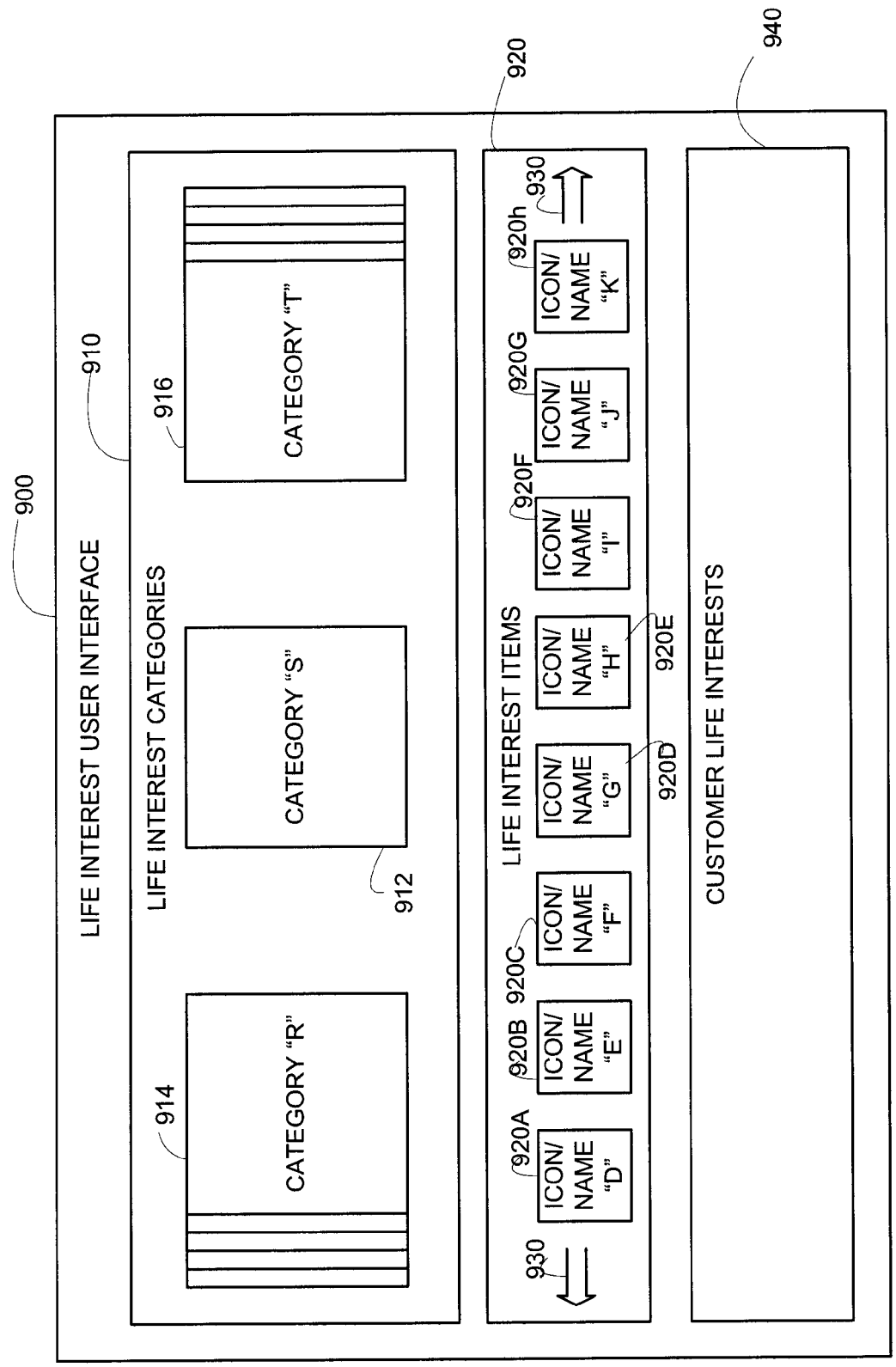
Figure 9:
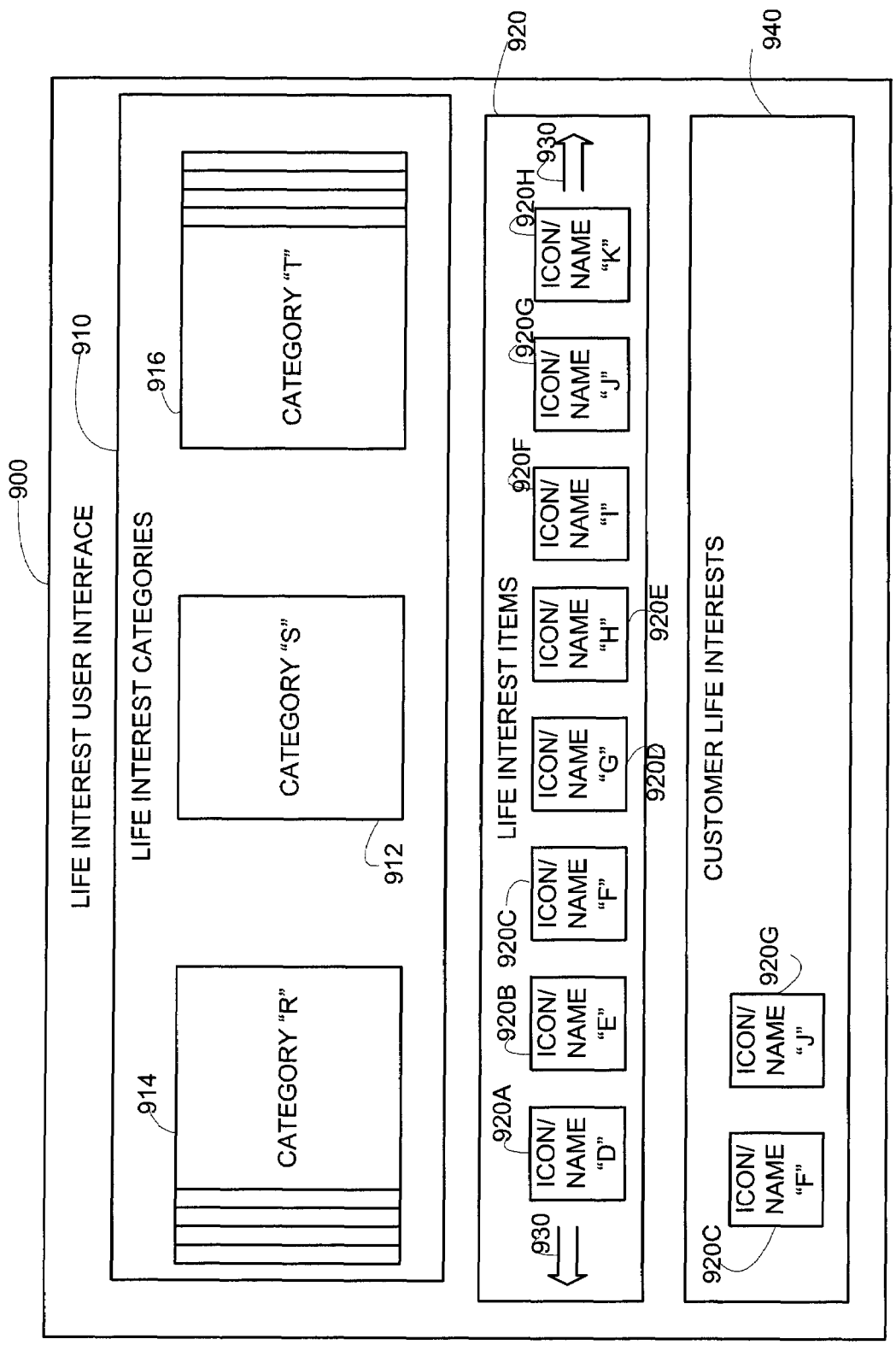
Figure 15:
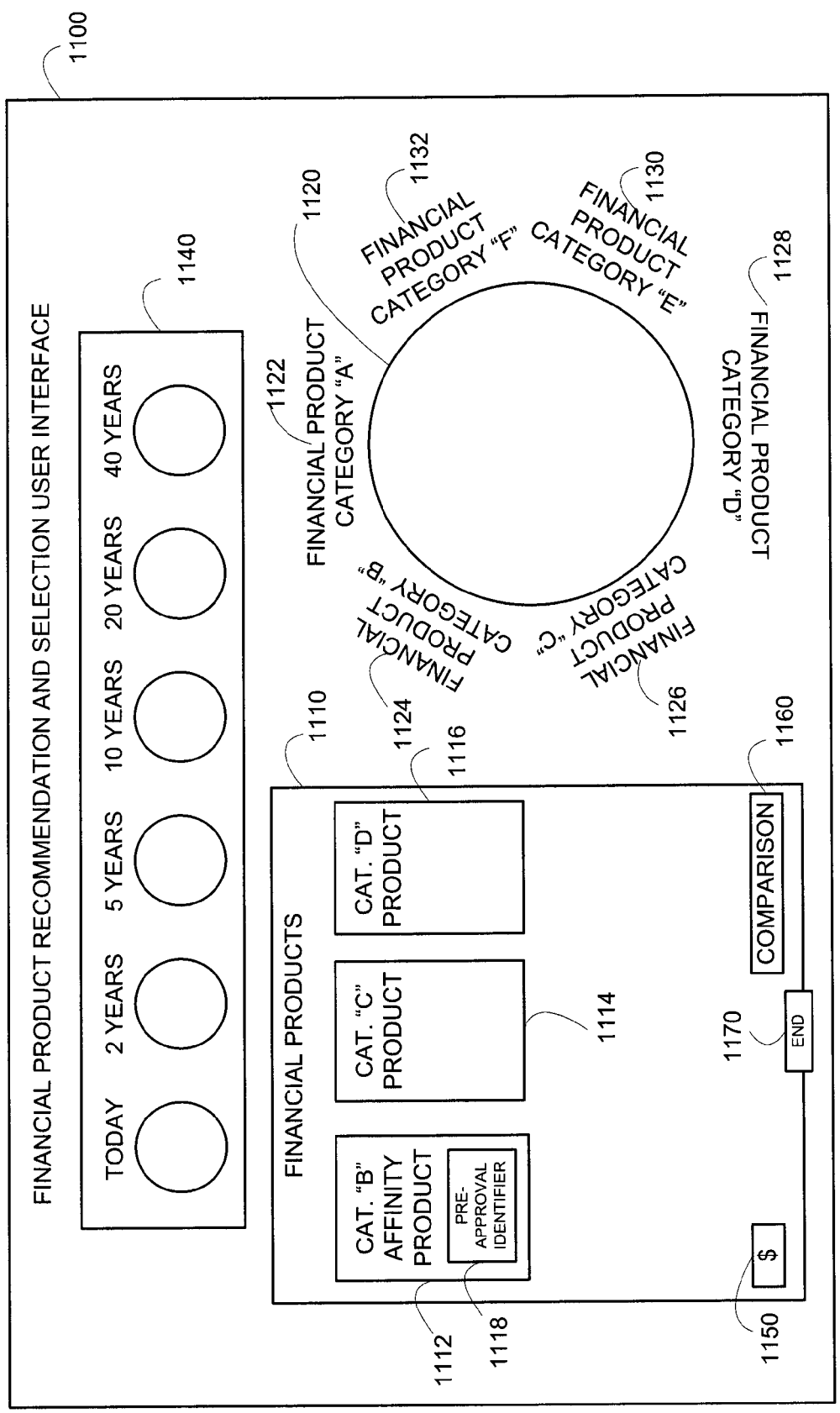
Figure 16:
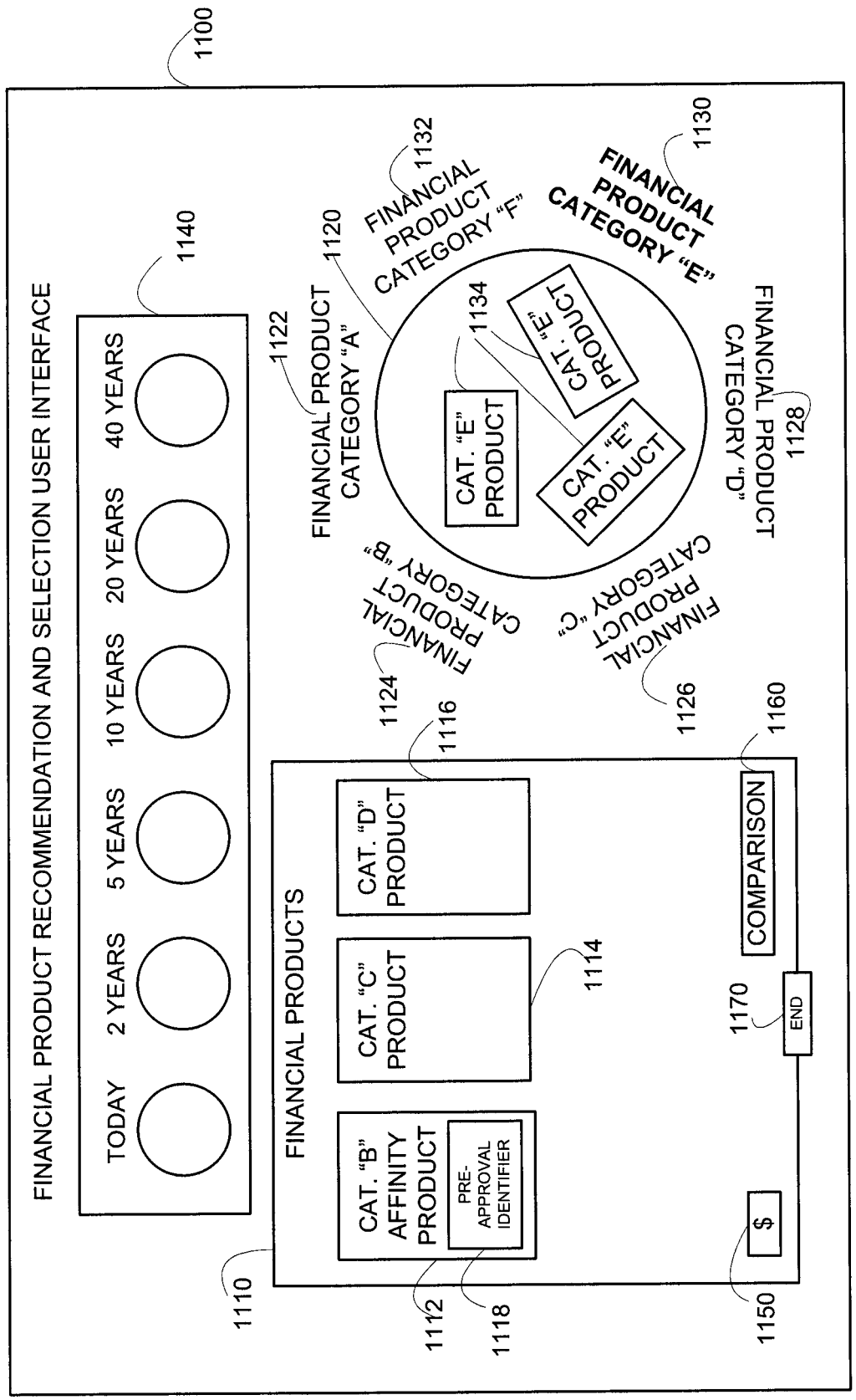
Figure 17:
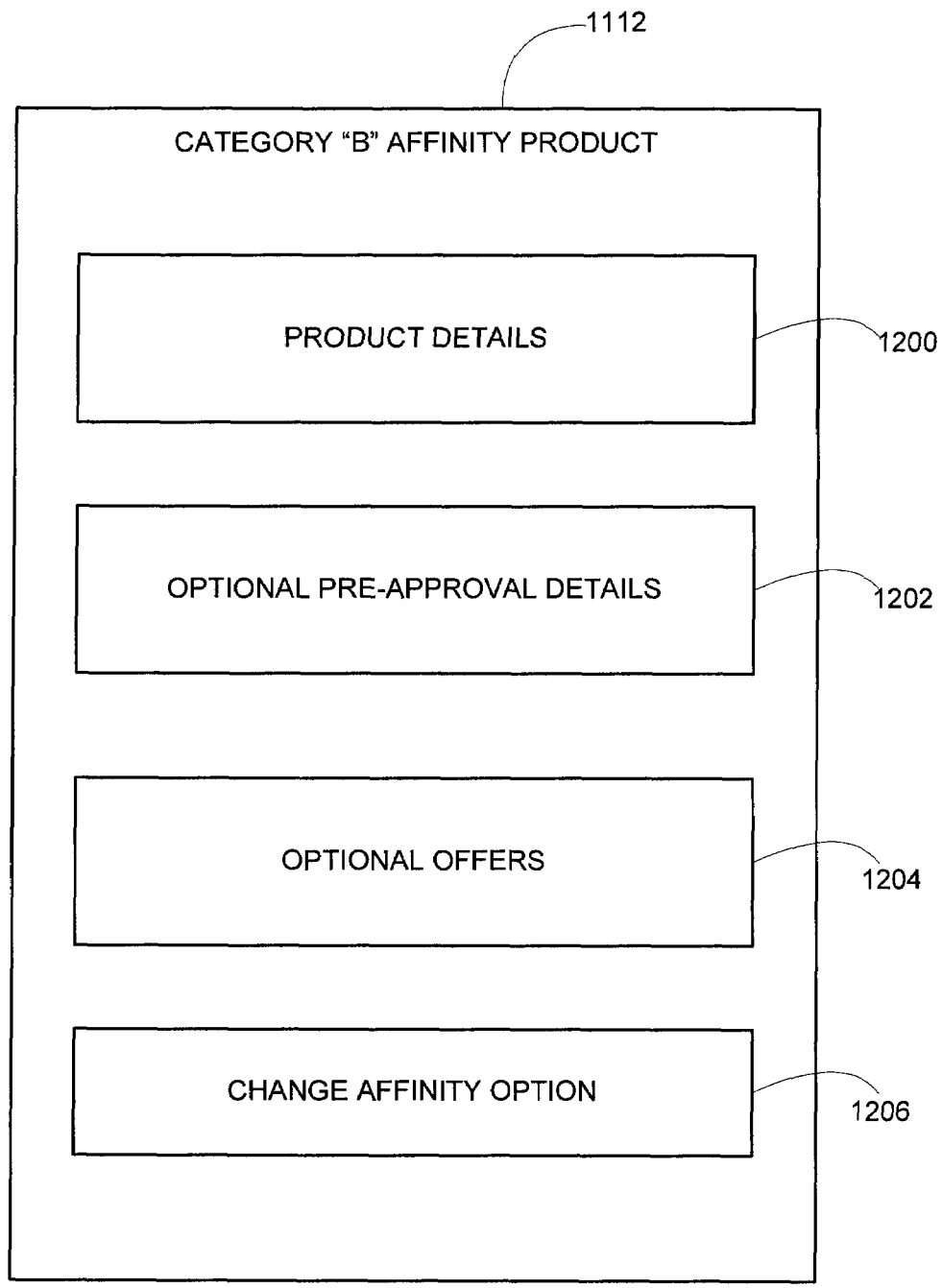
Figure 18:
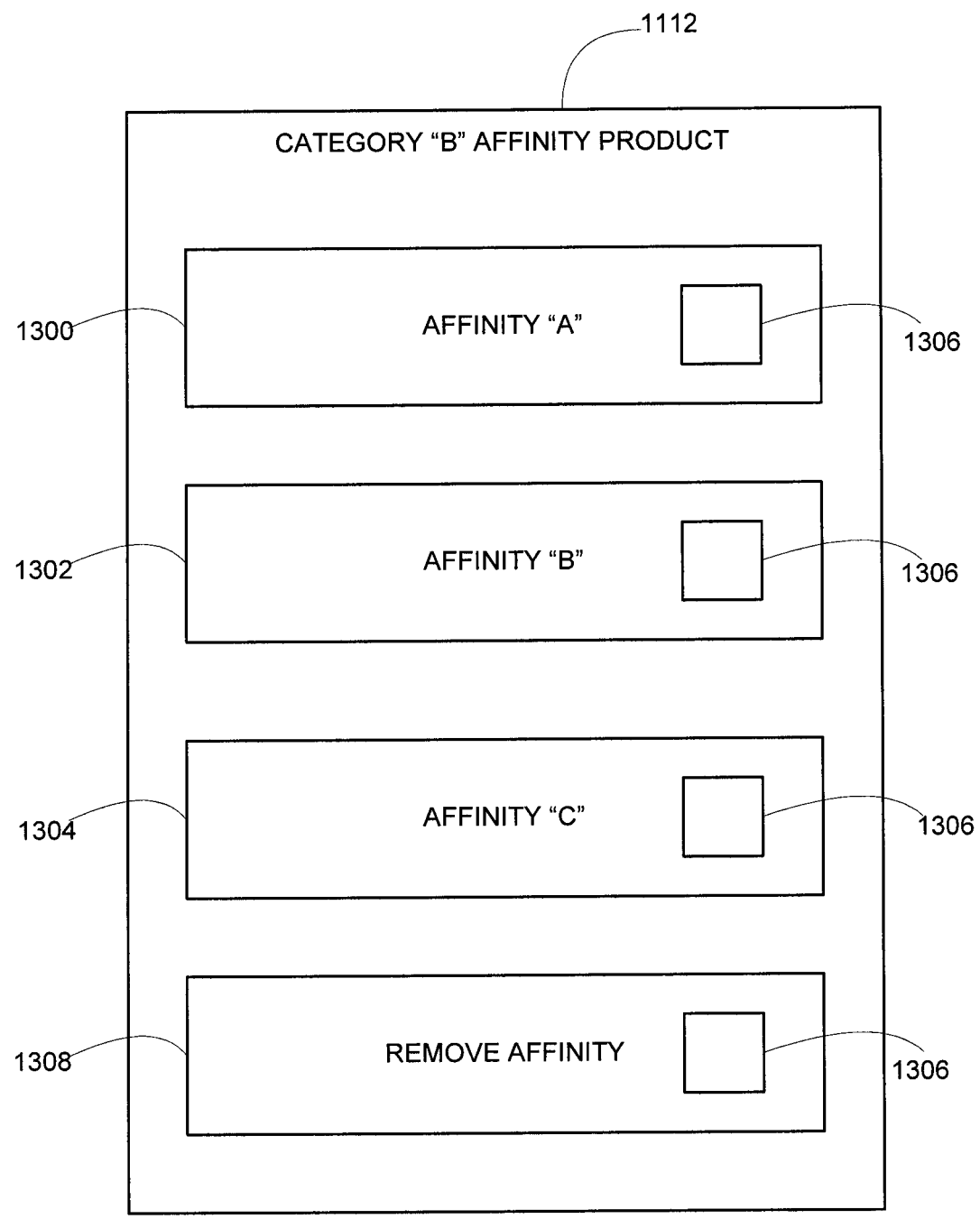
Figure 19:
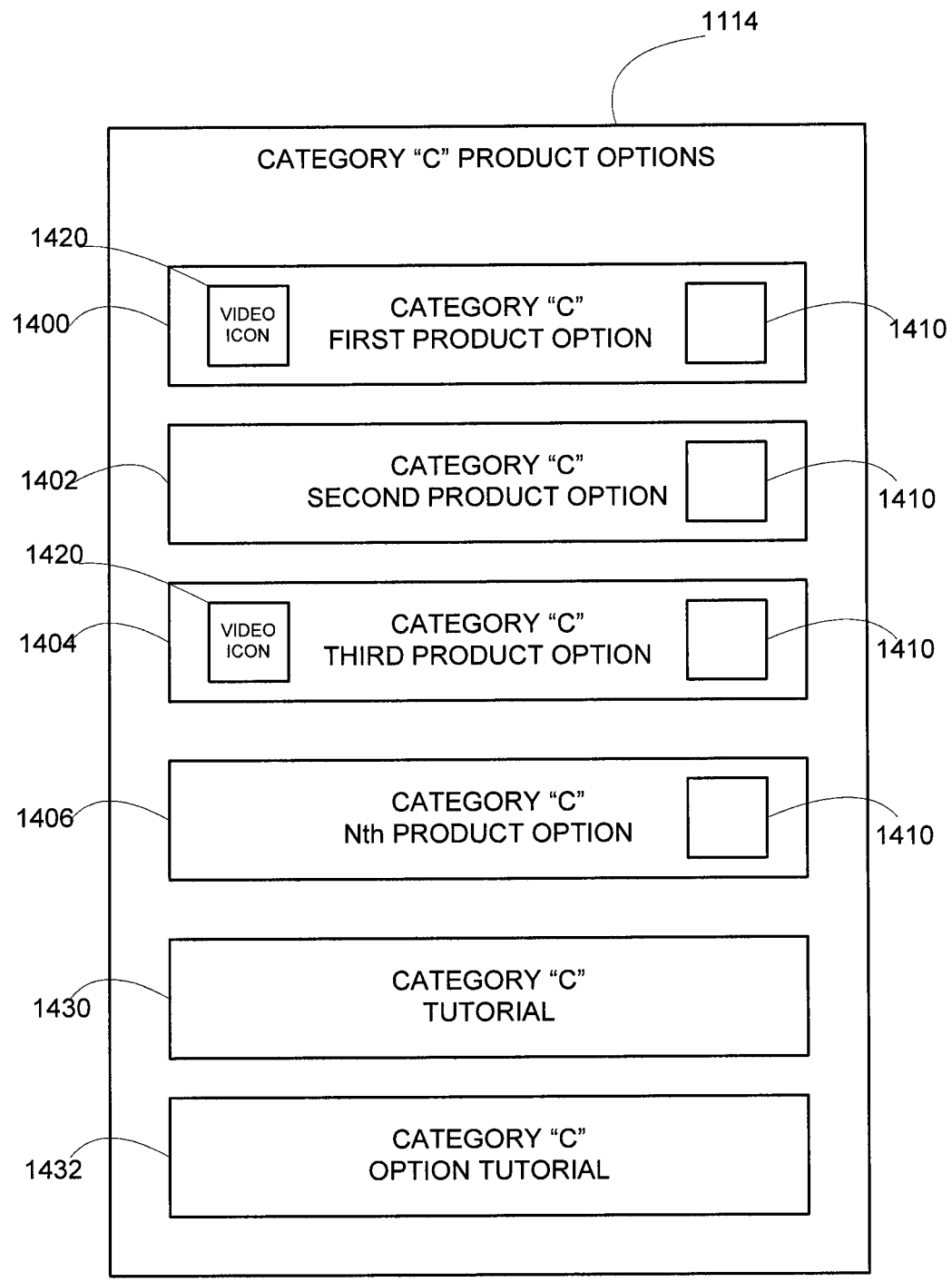
Figure 20:
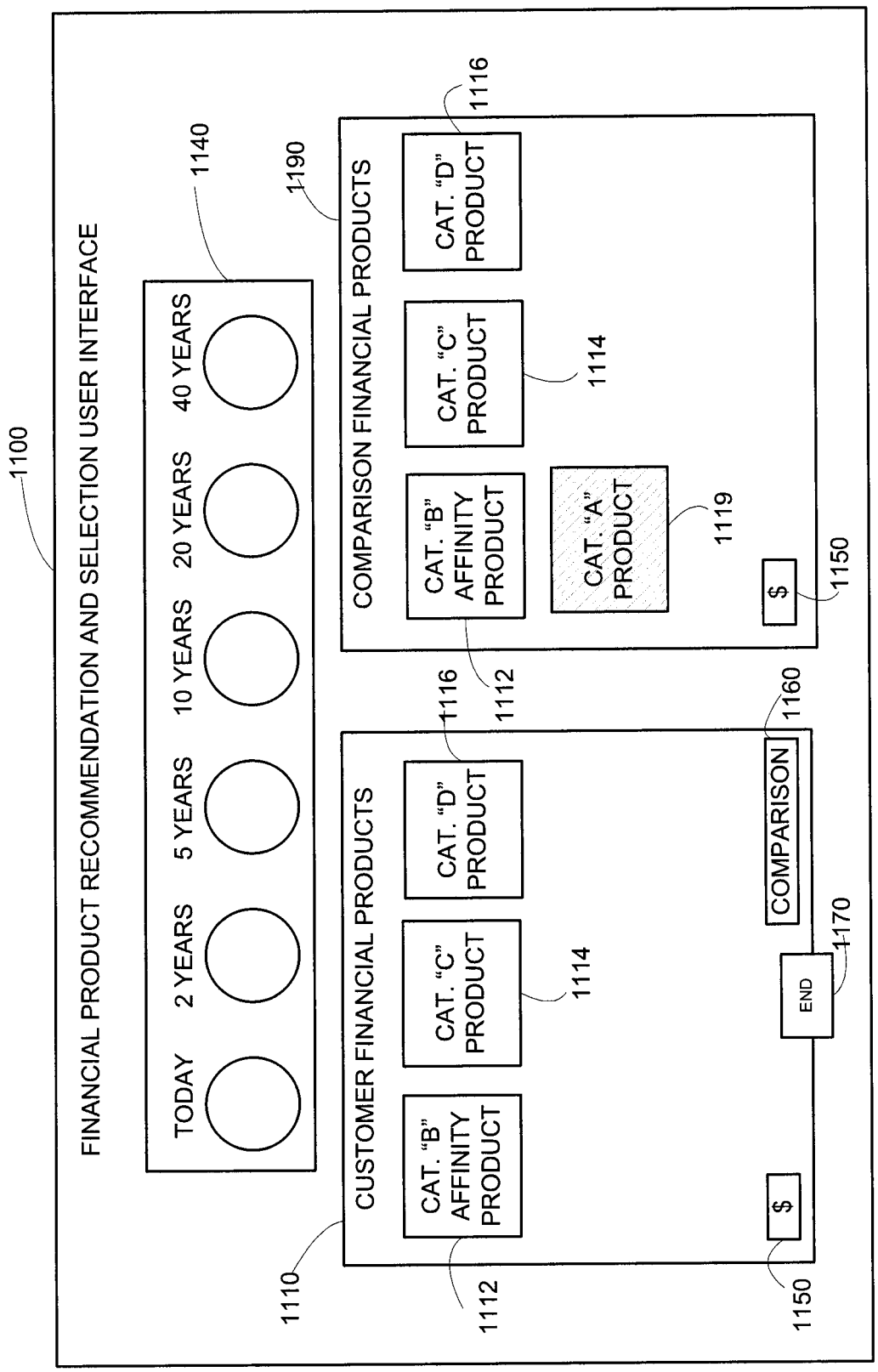
Figure 21:
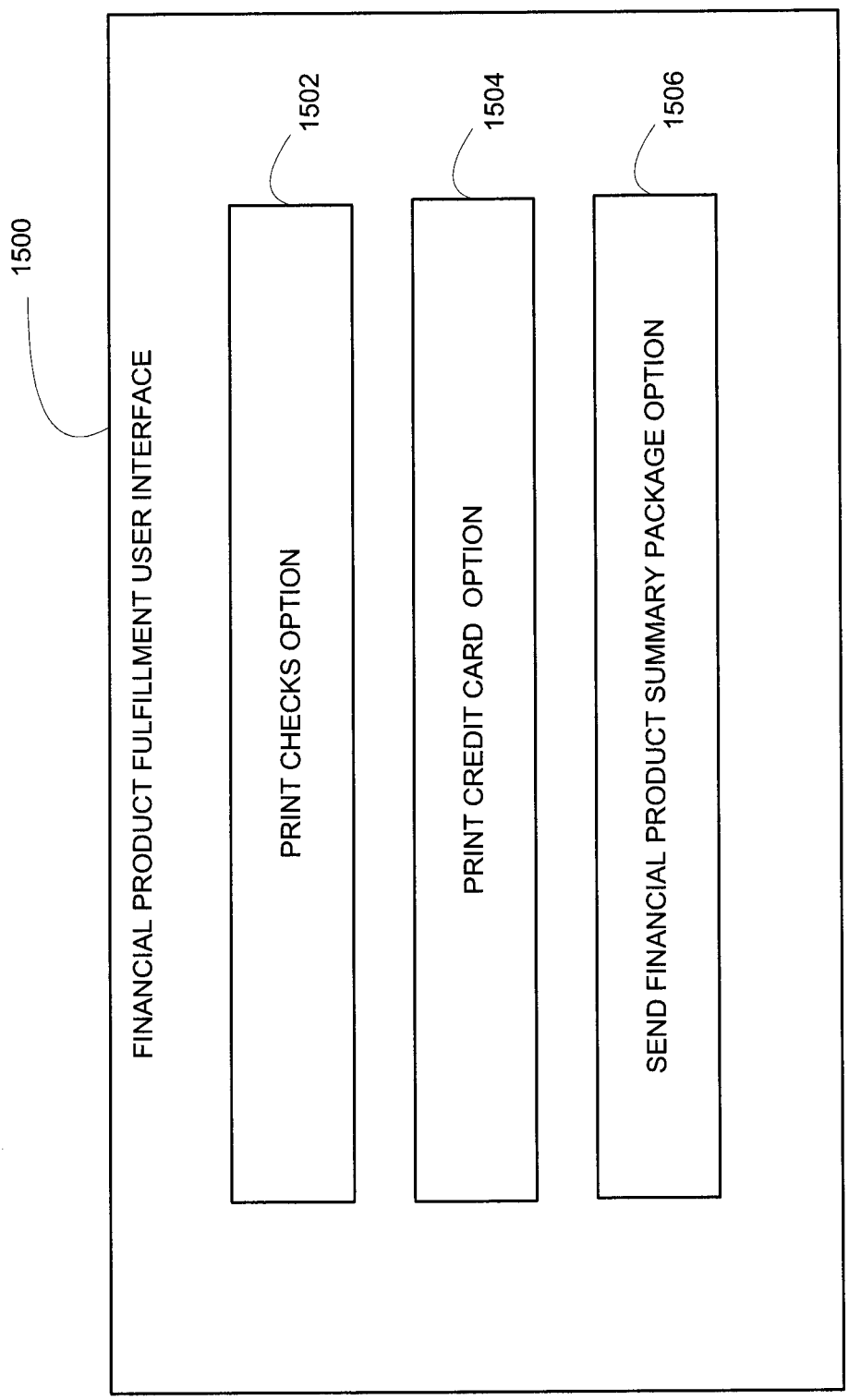
Figure 22:
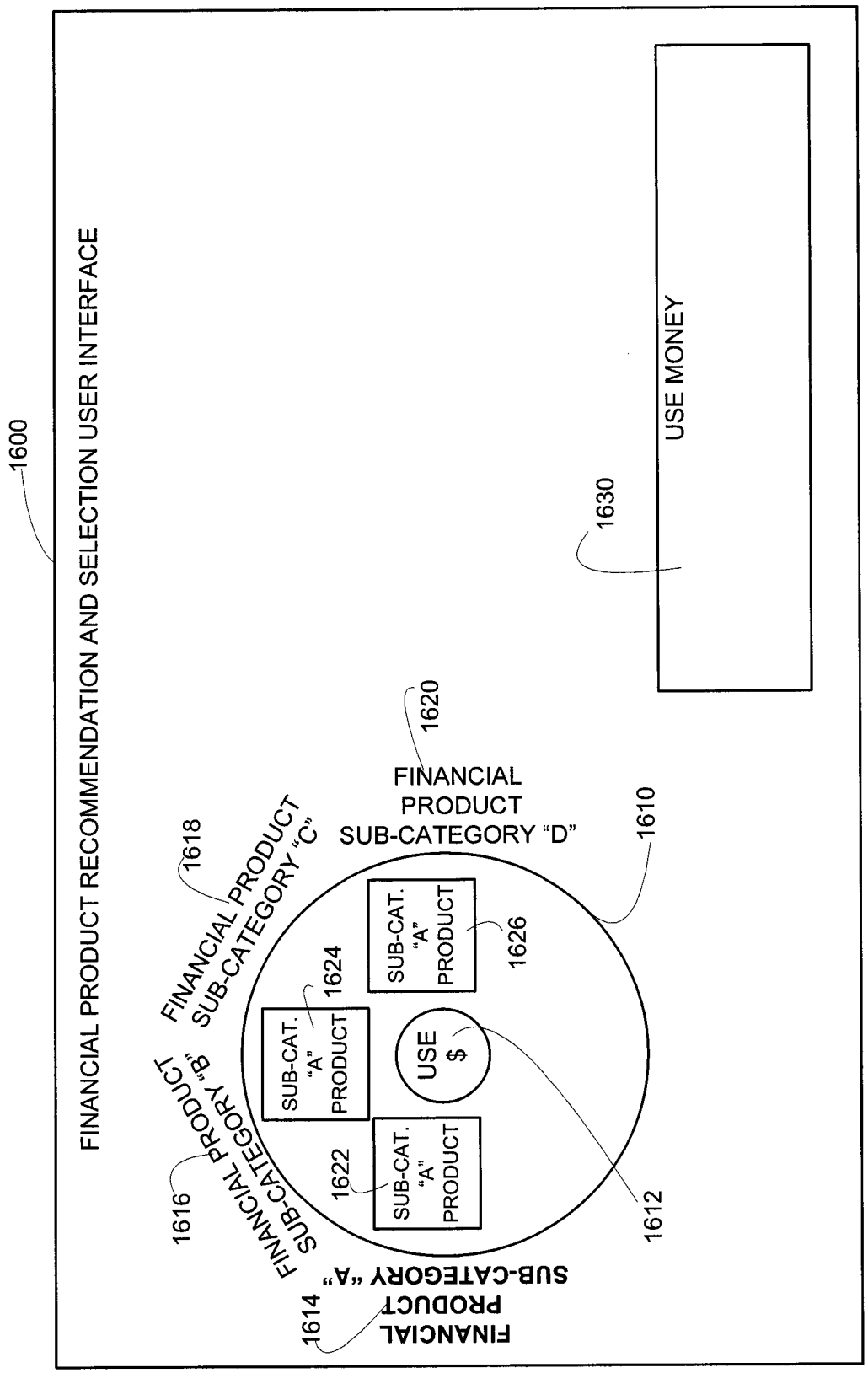
Figure 23:
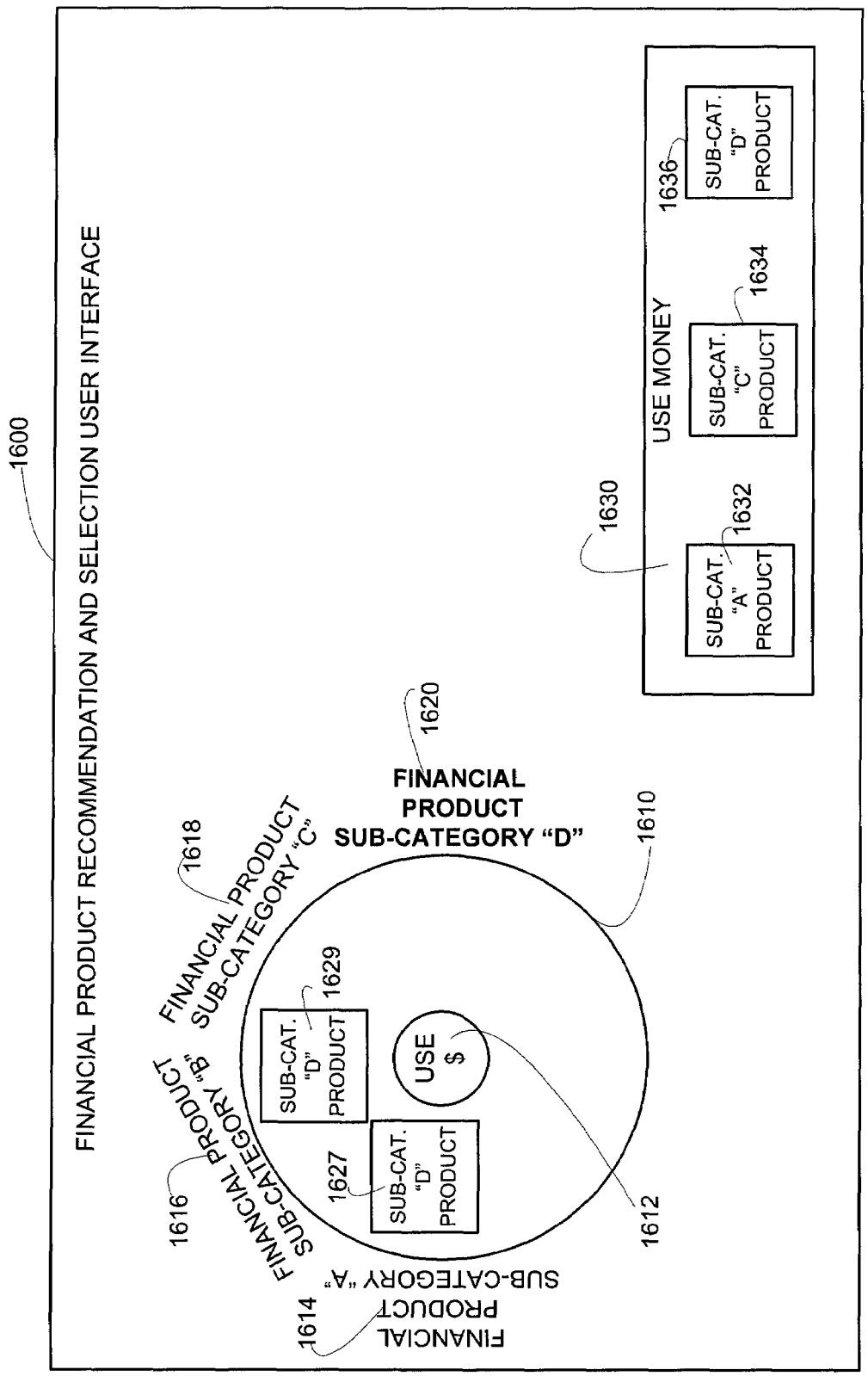
Figure 24:
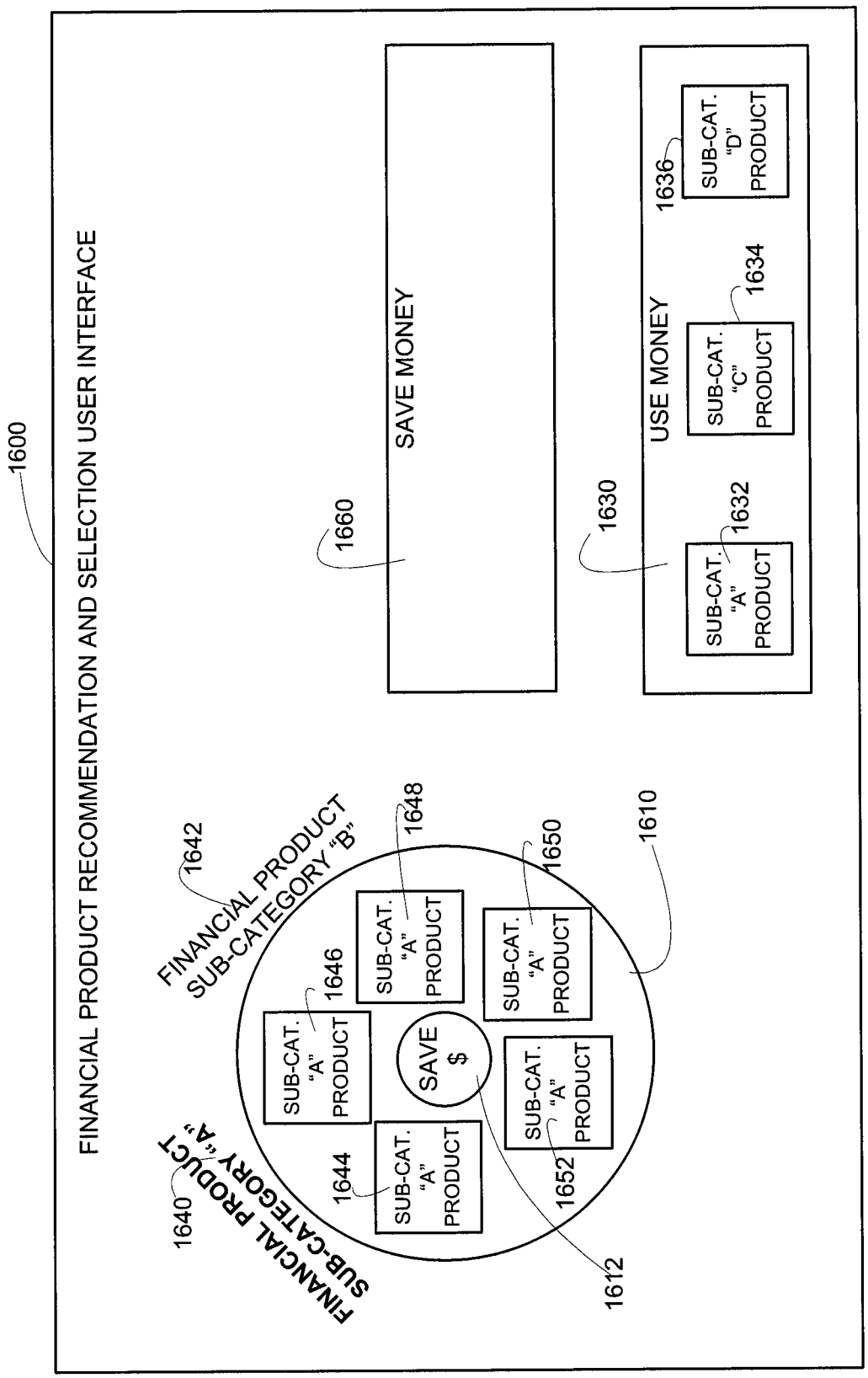
Figure 25:
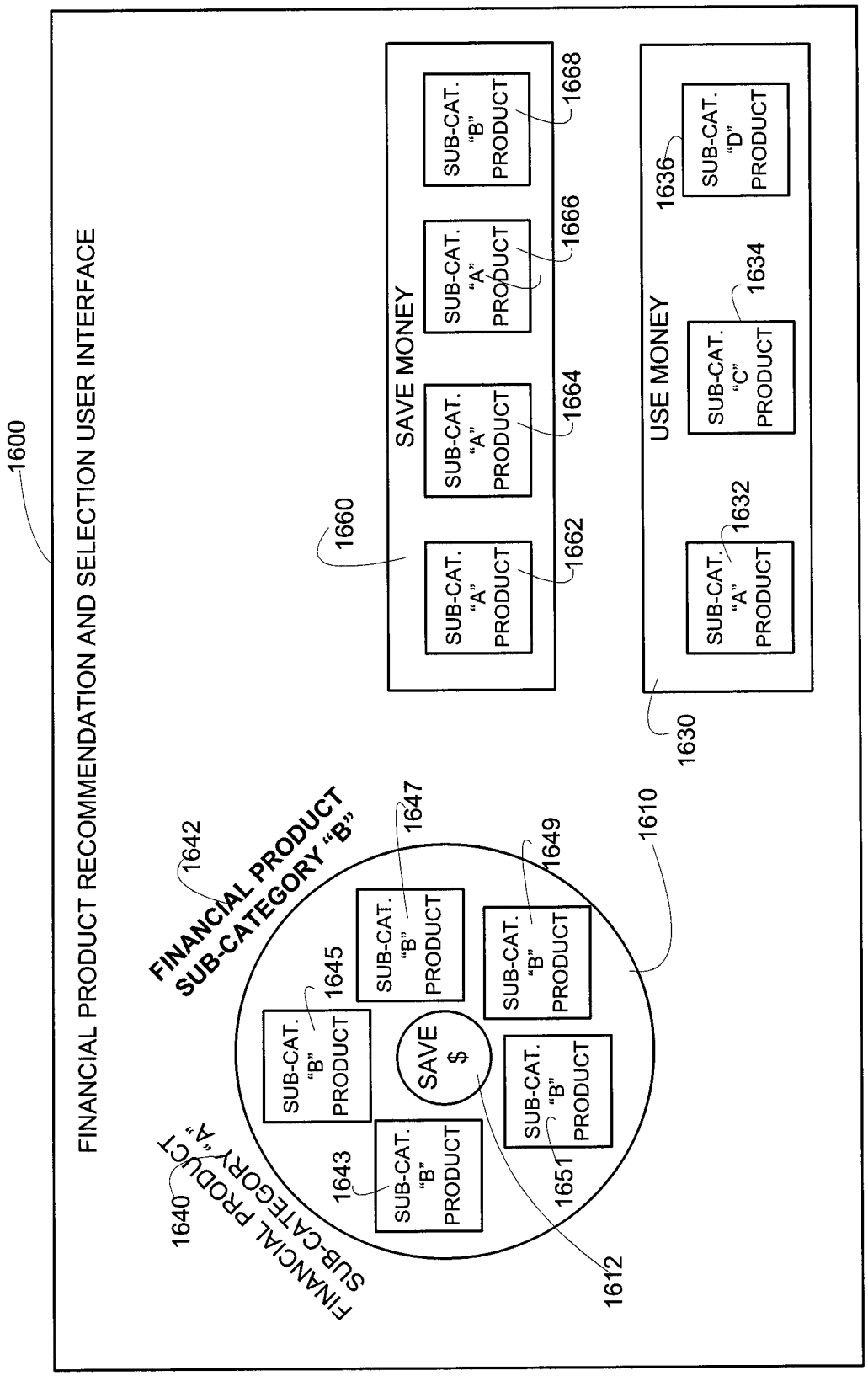
Figure 26:
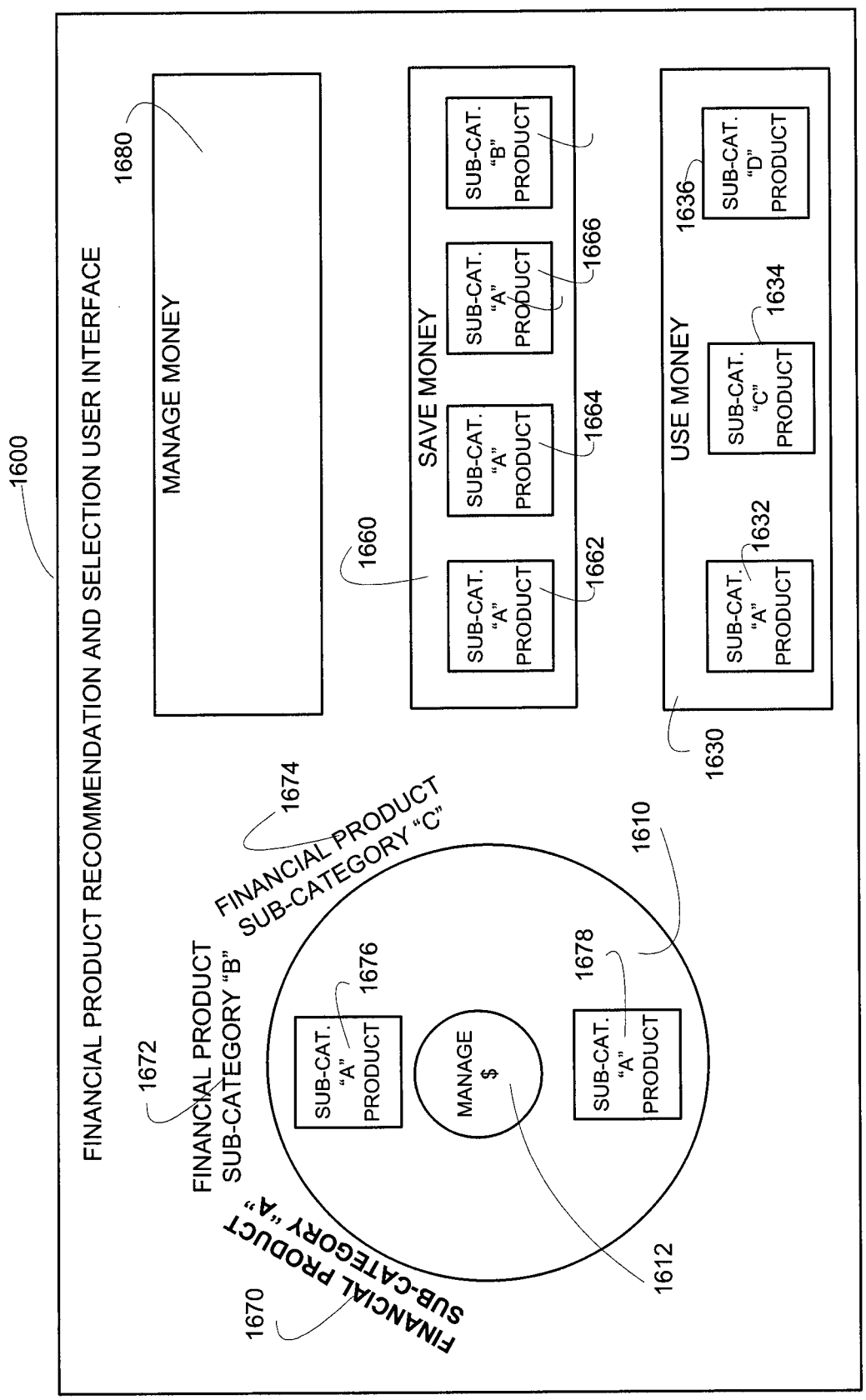
Figure 27:
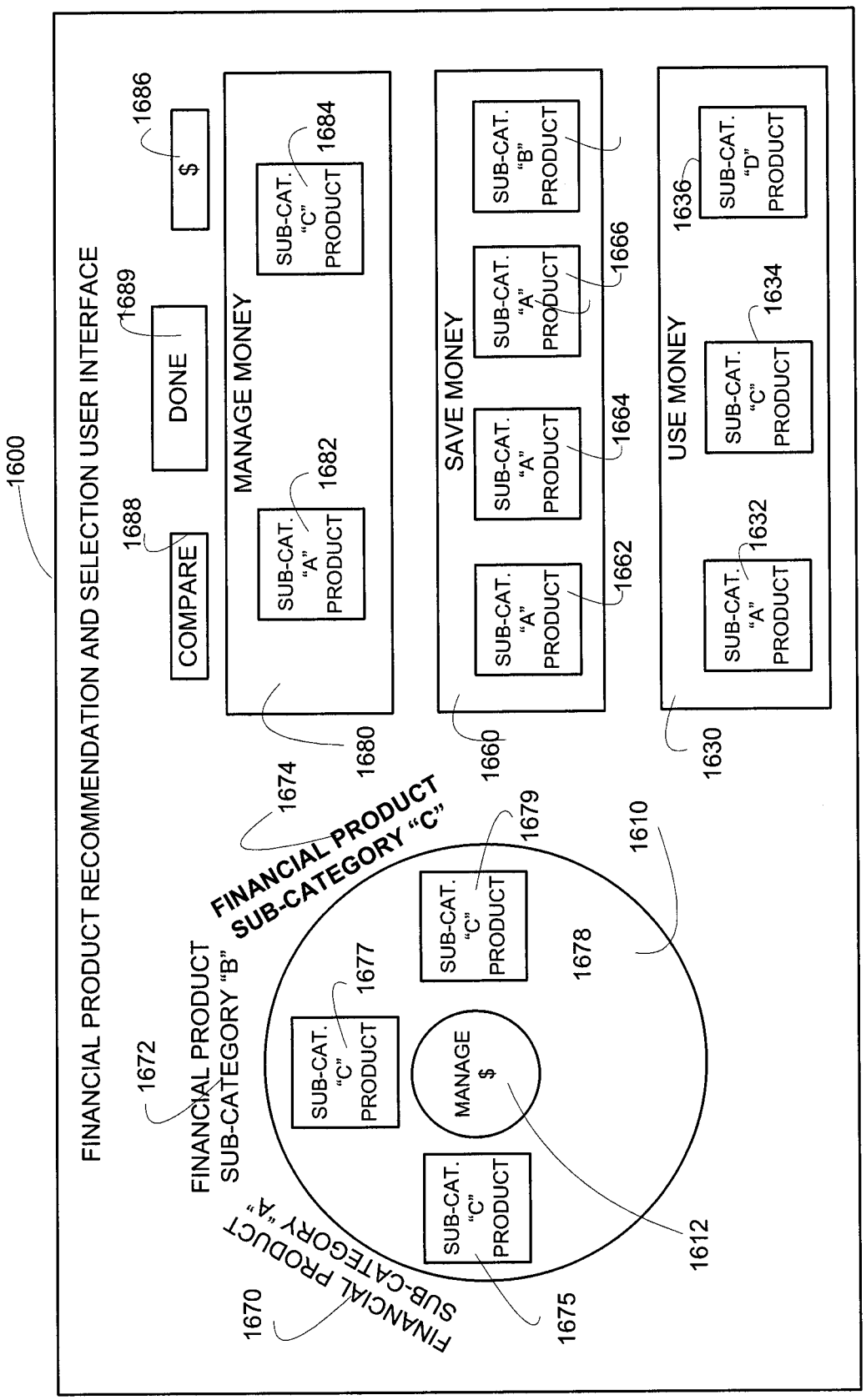
Figure 28:
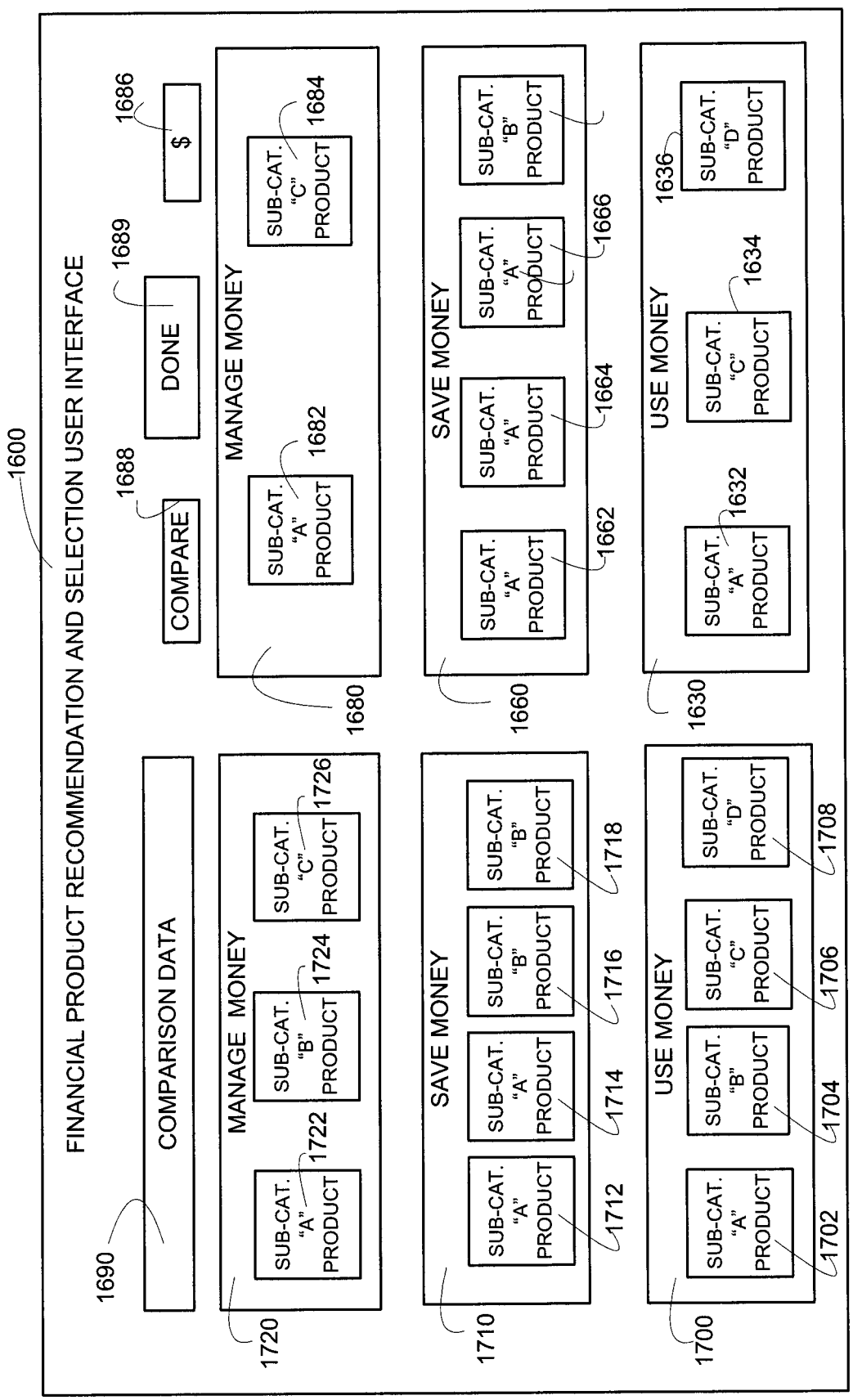
Figure 29:
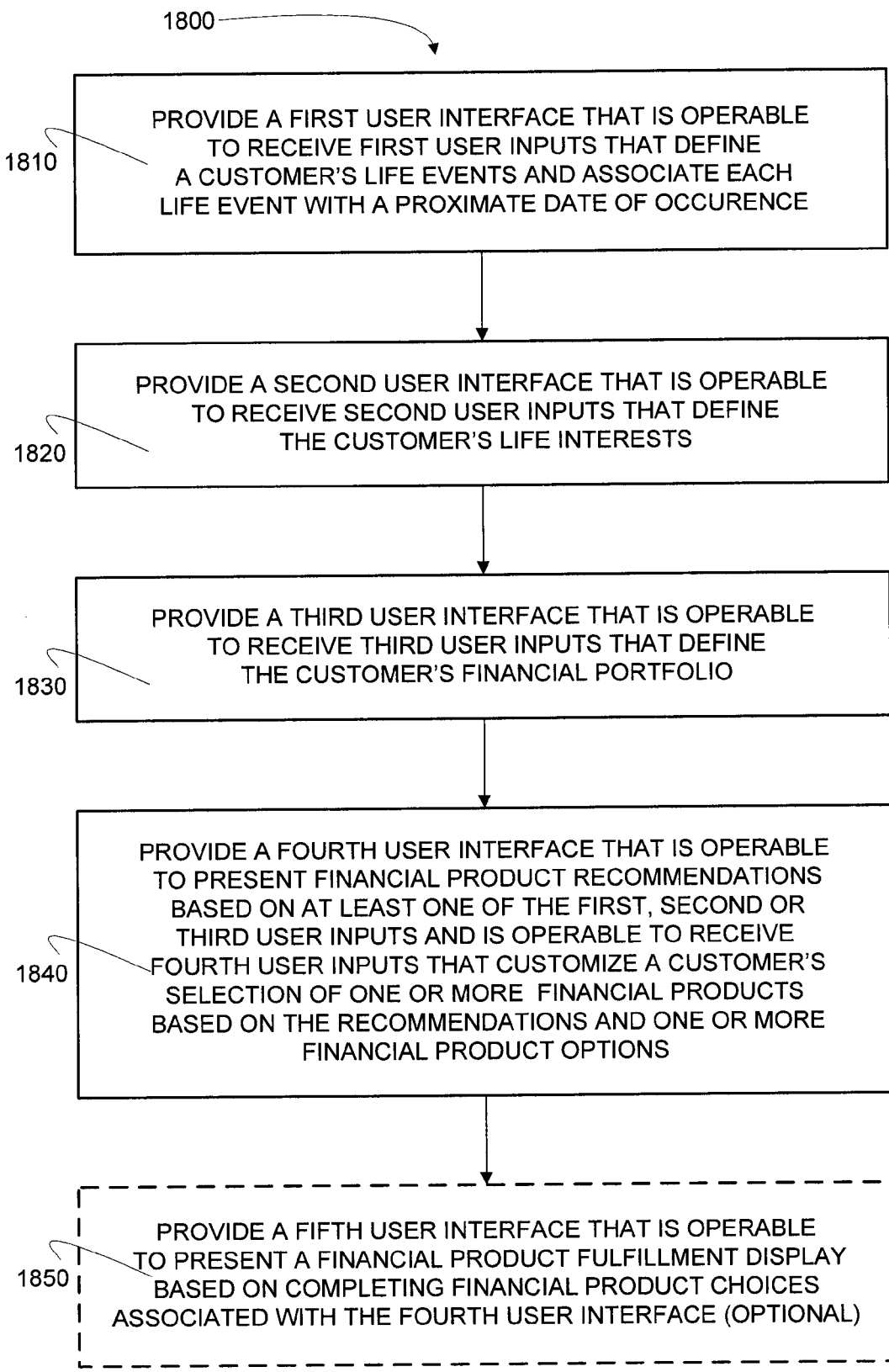
Figure 30:
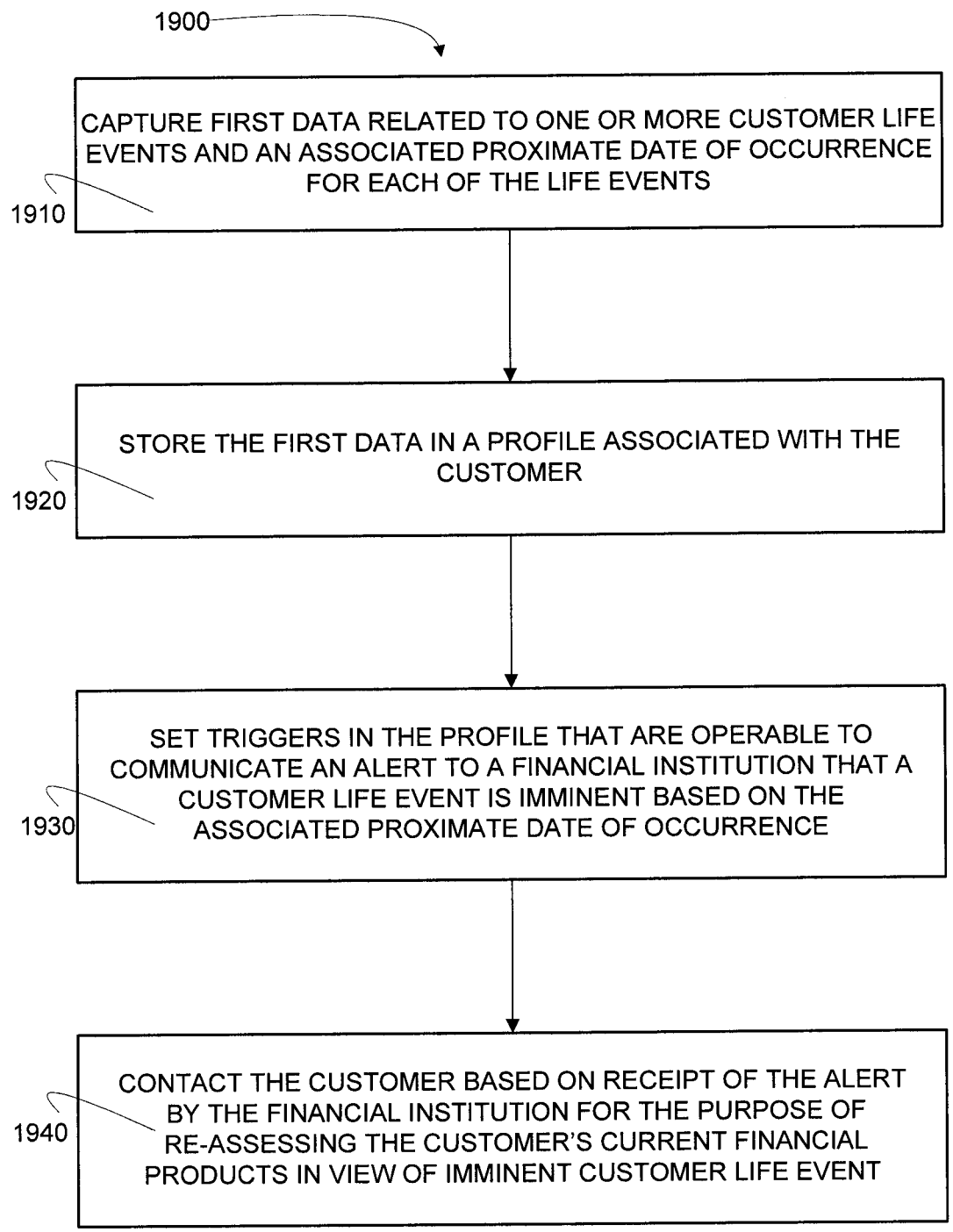

Having thus described embodiments of the invention in general terms, reference will now be made to the accompanying drawings, which are not necessarily drawn to scale, and wherein:

FIG. 1 is a flow diagram illustrating a method for providing financial product recommendations, in accordance with one embodiment of the present invention;

FIG. 2 is a flow diagram of an alternate method for providing financial product recommendations, in accordance with one embodiment of the present invention;

FIG. 3 is a block diagram of a customer experience module for providing financial product recommendations, in accordance with an embodiment of the present invention;

FIG. 4 is a block diagram of a system for providing an interactive and collaborative customer experience including financial product recommendations, in accordance with one embodiment of the present invention;

FIG. 5-FIG. 7 illustrate examples of a life event user interface, according to another embodiment of the present invention;

FIG. 8 and FIG. 9 illustrate examples of a life interest user interface, according to a further embodiment of the present invention;

FIG. 10-FIG. 14 illustrate examples of a financial portfolio user interface, according to another embodiment of the present invention;

FIG. 15 and FIG. 16 illustrate examples of a financial product recommendation and customization user interface, according to another embodiment of the present invention;

FIG. 17 illustrates an example of an affinity financial product summary, according to another embodiment of the present invention;

FIG. 18 illustrates an example of an affinity financial product affinity change option presentation, according to another embodiment of the invention;

FIG. 19 illustrates an example of a financial product option selection and multimedia access presentation, according to another embodiment of the invention;

FIG. 20 illustrates another example of a financial product recommendation and customization user interface that highlights product selection comparison, according to another embodiment of the invention;

FIG. 21 illustrates an example of a financial product fulfillment user interface, according to yet another embodiment of the present invention;

FIG. 22 is a block diagram representation of an alternate financial product recommendation and customization user interface highlighting the use money category, in accordance with an embodiment of the present invention;

FIG. 23 is a block diagram representation of a financial product recommendation and customization user interface highlighting the selection of products in the use money category, in accordance with an embodiment of the present invention;

FIG. 24 is a block diagram representation of a financial product recommendation and customization user interface highlighting the save money category, in accordance with an embodiment of the present invention;

FIG. 25 is a block diagram representation of a financial product recommendation and customization user interface highlighting the selection of products in the save money category, in accordance with an embodiment of the present invention;

FIG. 26 is a block diagram representation of a financial product recommendation and customization user interface highlighting the manage money category, in accordance with an embodiment of the present invention;

FIG. 27 is a block diagram representation of a financial product recommendation and customization user interface highlighting the selection products in the manage money category, in accordance with an embodiment of the present invention;

FIG. 28 is a block diagram representation of a financial product recommendation and customization user interface highlighting the comparison between selected financial products and comparison data for individual's with similar demographics, in accordance with an embodiment of the present invention;

FIG. 29 is a flow diagram of a method for providing a financial customer experience on a computing device, in accordance with an embodiment of the present invention; and FIG. 30 is a flow diagram of a method for financial product re-assessment, in accordance with an embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Various embodiments or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The steps and/or actions of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an Application Specific Integrated Circuit (ASIC). In the alternative, the processor and the storage medium may reside as discrete components in a computing device. Additionally, in some embodiments, the events and/or actions of a method or algorithm may reside as one or any combination or set of codes and/or instructions on a machine-readable medium and/or computer-readable medium, which may be incorporated into a computer program product.

In one or more embodiments, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

Thus, methods, systems, computer programs and the like are herein disclosed that provide for an interactive financial customer experience for collaboratively selecting financial products for the customer. The collaborative nature of the financial customer experience provides the customer with more interaction and input to the selection of financial products than has previously been afforded the customer. By having the customer and the financial institution associate work together to make decisions regarding the financial products that are best suited for the customer, the customer has more ownership of the overall selection process and builds a trust relationship with the financial institution. Additionally, by assessing the customer's life events at the onset of the customer experience and subsequently using the life events and the proximate date of occurrence of the life events to determine financial product recommendations for the customer, the resulting financial product recommendations are much more tailored to the long-term needs of the customer.

Referring to FIG. 1, a flow diagram is depicted of a method 100 for providing financial product recommendations to a customer, according to an embodiment of the present invention. At Event 110, one or more user inputs are received that provide for customer life events and an associated proximate date for the occurrence of each life event. Examples of life events include, but are not limited to, owning a home, a major purchase, such as an automobile purchase, a second home or the like, having children, paying for college, saving money, retirement, changing employment, moving to a new house and/or city, or any other major event having financial significance. The proximate date that is associated with each event may be a specific month or year, a range of years or any other proximate date. Events that have already occurred in the life of the customer or are currently occurring may be deemed to have a current or present proximate date. The user inputs may be provided for by the customer, by the financial institution associate or by a combination of both the customer and the financial institution associate.

In one specific embodiment of the present invention, the user inputs that provide for life events and an associated proximate date may be performed on a displayable user interface that includes life tags and a timeline having date range buckets. An example of such an embodiment is shown in relation to FIGS. 5-7 and will be discussed in detail infra. In such an embodiment, the life event tags may be moved about the user interface into an appropriate date range bucket to provide for the user input of the life event and the proximate date of occurrence of the life event. Movement of the life event tags into the date range buckets may be conducted by any input mechanism, such as mouse/pointer input device, or in the instance in which the display is a touch-screen display (e.g., a multi-touch screen), movement of the event tags may be provided by finger movements or any other input mechanism may be used without departing from the inventive concepts herein disclosed.

At Event 120, one or more financial product recommendations are determined for the customer based at least in part on the inputted life events and the associated proximate date of occurrence of each life event. It should be noted that for the sake of this disclosure and the claimed invention, the term "financial products" includes both financial products and financial services. Examples of financial products include, but are not limited to, checking accounts, savings accounts, credit cards, debit cards, online banking, protective services, and the like. Included within the financial product recommendation determination is the determination of any offers that may be provided to the customer for the financial products based on the life events, occurrence dates of the life events or any other factors, such as current financial portfolio or the like.

At Event 130, the financial product recommendations are provided to the customer via a user interface on a computing device. In one specific embodiment, the financial product recommendations may be provided when the user interface is initially displayed or otherwise accessed. In such an embodiment, the financial product recommendations may serve as the baseline for subsequent customer customization of the financial product package based on customer needs, collaboration with the financial institution associate or the like. In another specific embodiment, the financial product recommendations may not be provided when the user interface is initially displayed or otherwise accessed, but rather, may be provided for comparison purposes once the customer has selected a financial product package of choice. Examples of one specific embodiment of the user interface that provides for the financial product recommendations are shown in relation to FIGS. 15-16, which will be discussed in detail infra.

Referring to FIG. 2, a flow diagram is depicted of an optional embodiment of a method 200 for providing financial product recommendations to a customer, according to an embodiment of the present invention. At Event 210, one or more first user inputs are received that provide for customer life events and an associated proximate date for the occurrence of each life event. Similar to Event 110 of FIG. 1, the life events may include any previous, current or future event in the life of the customer. For example, the life events may include, but are not limited to, owning a home, a major purchase, such as an automobile purchase, a second home or the like, having children, paying for college, saving money, retirement, changing employment, moving to a new house and/or city, or any other major event having financial significance. The proximate date of the occurrence of the life event may be a month and/or year, or a range of years or any other suitable proximate date. According to one specific embodiment, the proximate dates may be defined by a timeline representation on a user interface, whereby life events are associated with a date or date range on the timeline to provide for the inputting of the life event and the associated proximate date.

At optional Event 220, one or more second user inputs are received that define the customer's life interests. Examples of life interests include, but are not limited to, charitable organizations, universities/colleges, professional sporting teams, other associations or organizations and the like. In certain embodiments, the second user inputs are subsequently used to determine one or more affinity financial products for the customer. Affinity financial products provide for the logo or other identifying features associated with the affinity to be represented on the financial product. Affinity financial products may include, but are not limited to, affinity credit cards, affinity debit cards, affinity checking accounts and the like. In addition to determining affinity financial products, the customer's life interest data may also be used to determine offers related to one or more financial products that are based on the customer's association with a life interest.

In one specific embodiment of the present invention, the second user inputs that provide for life interests may be performed on a displayable user interface that includes scrollable life interest categories and one or more life interest items for each category. An example of such an embodiment is shown in relation to FIGS. 8-9 and will be discussed in detail infra. In such an embodiment, the life interest items may be moved about the user interface into a customer life interest area to provide for the user input and define the life interests. Movement of the life interest items into the customer life interest area may be conducted by any input mechanism, such as a mouse/pointer input device, or in the instance in which the display is a touch-screen display (e.g., multi-touch screen), movement of the life interest items may be provided by finger movements, or any other input mechanism may be used without departing from the inventive concepts herein disclosed.

At optional Event 230, one or more third user inputs are received that define the customer's financial portfolio. The customer's financial portfolio may be defined in terms of the financial institutions that the customer currently has business with. In addition to defining the relevant financial institutions, the customer's financial portfolio may be defined in terms of the value of the specific asset accounts and liability accounts associated with the financial institutions. Asset accounts may include, but are not limited to, checking accounts, savings accounts, investment accounts and the like. Liability or debt accounts may include, but are not limited to, mortgage accounts, other loan accounts, credit card accounts and the like. Financial portfolio information may subsequently be used to determine recommendations for financial products and/or any offers associated with the financial product recommendations that may be offered to the customer based on their financial portfolio.

In one specific embodiment of the present invention, the third user inputs that provide for defining a customer's financial portfolio may be performed on a displayable user interface that includes scrollable financial institution cards. Whereby each card allows the customer to identify a financial institution as one which the customer conducts business with and, at the discretion of the customer, enters proximate values for an asset account or liability account associated with the particular financial institution. An example of such an embodiment is shown in relation to FIGS. 10-14 and will be discussed in detail infra. In such an embodiment, a sliding account value bar may be implemented on the user interface to allow the user to proximate the value of the asset and liability accounts. Movement of the sliding account value bar may be conducted by any input mechanism, such as a mouse/pointer input device, or in the instance in which the display is a touch-screen display (e.g., multi-touch screen), movement of the sliding value bar may be provided by finger movements, or any other input mechanism may be used without departing from the inventive concepts herein disclosed.

At Event 240, one or more financial product recommendations are determined for the customer based at least in part on the inputted life events and the associated proximate date of occurrence of each life event and, in some instances, the customer's life interests and/or the customer's financial portfolio information. In certain embodiments, the customer's life events, associated proximate date of occurrence of the life events and the customer's financial portfolio may be relied upon to determine financial product recommendations and any offers associated with the financial product recommendations. In other aspects, the customer's life events, associated proximate date of occurrence of the life events, the customer's financial portfolio and the customer's life interests may be relied upon to determine affinity financial product recommendations and any offers associated with the affinity financial products.

At Event 250, the financial product recommendations are provided to the customer via a user interface on the computing device. As previously noted, the financial product recommendations may be provided on the user interface upon initially accessing or providing the user interface or, in other embodiments, the financial product recommendations may be provided based on the user choosing to compare a selected set of financial products to the recommended financial products. See FIGS. 15-16 and the related discussion for more details.

At optional Event 260, one or more financial product options may be provided on the user interface in addition to providing the financial product recommendations. The financial product options allow the customer, in collaboration with a financial institution associate, to build a financial product package best suited for the customer's current and future financial needs. In certain embodiments, the financial product options that are provided to the customer via the user interface may be determined based on the life events, the proximate date of occurrence of the life events, the customer's financial portfolio and/or the customer's life interests. Thus, at optional Event 270, fourth user inputs may be received that customize the customer's selection of financial product(s) based on the financial product recommendations and the financial product options. As previously noted for other user inputs, the fourth user inputs may be inputted by the customer, the financial institution associate or a combination of the customer and the associate.

Turning the reader's attention to FIG. 3, a block diagram is depicted of a customer experience module 300 that is operable for providing a platform for customizing a customer's financial product needs based on one or more criteria, in accordance with an embodiment of the present invention. The customer experience module 300 includes a life event user interface routine 310 operable for providing a user interface, such as a displayable graphical user interface, suitable for inputting life events and the associated proximate date of occurrence of the life events. As previously noted, in one specific embodiment the life event user interface routine 310 may provide for a user interface that includes a timeline, such that life events may be associated with a date or date range within the timeline to input a life event and define the proximate date of occurrence of the life event.

The customer experience module 300 may optionally include a life interest user interface routine 320 operable for providing a user interface, such as a displayable graphical user interface, suitable for inputting life interests. As previously noted, in one specific embodiment the life interest user interface routine 320 may provide for a user interface that includes a scrollable catalog of life interest categories, each category having one or more life interest items, such that life interest items may be selected by the customer to form a group of one or more customer life interests.

Additionally, the customer experience module 300 may optionally include a financial portfolio user interface routine 330 operable to provide a user interface, such as a displayable graphical user interface, suitable for inputting financial portfolio information. As previously noted, in one specific embodiment, the financial portfolio user interface routine 330 may provide for a user interface that includes a scrollable catalog of financial institutions cards, with each financial institution card allowing for the user to denote use of the financial institution and assess the value of any asset accounts or liability accounts associated with the specific financial institutions.

The customer experience module 300 additionally includes a financial product recommendation and customization user interface routine 340 operable to provide a user interface, such as a displayable graphical user interface, suitable for providing financial product recommendations based at least in part on the customer's life events and associated proximate dates of the life events and, in some embodiments, the life interests and/or the financial portfolio information. In addition to providing the financial product recommendations, the user interface may provide for customer customization of a desired financial product package based on additional financial options presented to the user on the user interface. The additional financial product options may be based at least in part on the customer's life events and associated proximate dates of the life events and, in some embodiments, the life interests and/or the financial portfolio information.

It should be noted that while FIG. 3 depicts the user interfaces as being separate entities, the functionality and/or operability of two or more user interfaces may be combined in a single user interface, such that a single display may be provided to allow input of more than one customer information category. For example, a single graphical user interface display may provide for user input of a life event, life interest and financial portfolio information. Additionally, it is contemplated and within the confines of the inventive concepts that all of the user interfaces herein described may be combined in a single graphical user interface display. In such a configuration, it may be possible to provide the user inputs of life event, life interest and financial portfolio information and financial product recommendation and customization platform in a single graphical user interface display.

Referring to FIG. 4, a block diagram is representative of a system 400 for providing a customer experience to a financial customer, in accordance with another embodiment of the present invention. The system may include a computing device 500, an optional customer database server 600 and an optional customer sales/service server 700. The system 400 is operable to provide the customer experience platform to the customer and financial institution associate. In one specific embodiment, the computing device may be a Microsoft Surface™ available from the Microsoft Corporation of Seattle, Wash. The computing device 500 includes a computing platform 510 that can transmit data across a wired or wireless network, and that can receive and execute routines and applications. Computer platform 510 includes memory 520, which may comprise volatile and non-volatile memory such as read-only and/or random-access memory (RAM and ROM), EPROM, EEPROM, flash cards, or any memory common to computer platforms. Further, memory 520 may include one or more flash memory cells, or may be any secondary or tertiary storage device, such as magnetic media, optical media, tape, or soft or hard disk.

Further, computing platform 510 also includes at least one processor 530, which may be an application-specific integrated circuit ("ASIC"), or other chipset, processor, logic circuit, or other data processing device. Processor 530 may include various processing subsystems (not shown in FIG. 4) embodied in hardware, firmware, software, and combinations thereof, that enable the functionality of computing device 500 and the operability of the computing device 500 on a network. For example, processing subsystems may allow for initiating and maintaining communications, and exchanging data, with other networked devices. Thus, in certain embodiments, it may be possible to configure processor 530 with a processing subsystem that includes the customer experience module 300.

The computing platform 510 of computing device 500 additionally includes input mechanism 540 for generating inputs into computing device 500, and output mechanism 550 for generating information for consumption by the user of the computing device 500. For example, input mechanism 540 may include a mechanism such as a key or keyboard, a mouse, a touch-screen display, a microphone, etc. Further, for example, output mechanism 550 may include a display, an audio speaker, a haptic feedback mechanism, etc. In one specific embodiment, the input mechanism 540 may be a multi touch-screen display and the output mechanism 550 may be the same multi touch-screen display.

The memory 520 of computing device 500 includes the customer experience module 300 shown and described in relation to FIG. 3. The customer experience module 300 is operable to provide a platform for customizing a customer's financial product needs based on one or more criteria. As previously discussed, the customer experience module 300 includes a life events user interface routine 310 and a financial product recommendation and customization user interface routine 340. The customer experience module 300 may also optionally include a life interest user interface routine 320 and a financial portfolio user interface routine 330.

The system may additionally include a customer sales/service server 700 that includes a customer financial product recommendation and offer module 710. The customer financial product recommendation and offer module 710 is operable to determine financial product recommendations for the customer based on the inputs made to the customer experience module 300. In one embodiment, the customer financial product recommendation and offer module 710 makes financial product recommendations and, optionally, offers based at least in part on the life event inputs and the associated proximate dates of occurrence for the life events. In other embodiments, the customer financial product recommendation and offer module 710 may make financial product recommendations and, optionally, offers based at least in part on the life event inputs, the associated proximate dates of occurrence for the life events, and at least one of the life interest inputs and the financial portfolio information. It should be noted that while the customer financial product recommendation and offer module 710 is shown as being executed on the customer sales/service server 700, in other embodiments it may be feasible and conducive to store and execute the customer financial product recommendation and offer module 710 on the computing device 500.

The customer sales/service server 700 may additionally include a customer product/service comparison module 720 operable to determine a comparison package of financial products for the customer. The comparison package may be based on the life events of the customer, the financial portfolio of the customer or other demographic information provided by the customer. In one embodiment, the comparison package may be operable to show what customers of similar demographic background/life events/financial background have previously purchased or otherwise assembled as their particular financial product package. Thus, the customer product/service comparison module 720 may be in networked communication with databases, such as customer database server 600 or the like, to determine the financial product packages of other customers. Access to the comparison package information may be provided to the customer via an option within the financial product recommendation and customization user interface routine 340. It should be noted that while the customer financial product/service comparison module 720 is shown as being executed on the customer sales/service server 700, in other embodiments it may be feasible and conducive to store and execute the customer product/service comparison module 710 on the computing device 500.

The customer sales/service server 700 may additionally include a customer affinity offer determination module 730 operable to determine one or more affinity options for recommended financial products based on the customer's life interest inputs provided for by the life interests user interface routine 320 of the customer experience module 300. It should be noted that, while the customer affinity offer determination module 730 is shown as being executed on the customer sales/service server 700, in other embodiments it may be feasible and conducive to store and execute the customer affinity offer determination module 730 on the computing device 500.

The system 400 may also include a customer database server 600 that is operable to store a plurality of customer profiles 610. The customer profiles 610 may include entries for life events and associated occurrence date 620, optional financial portfolio data 630, optional life interest data 640 and financial products 650 that the customer has selected/purchased or otherwise shown an interest in. The customer profiles may be relied upon by the customer product/service comparison module 720 to determine what financial product packages have been selected by customers with similar life events, life interests, financial portfolios and/or demographics as the customer of note.

In addition, the customer profile 610 may be relied upon to re-evaluate the customer's financial product needs over time. In this regard, triggers may be set to contact the customer at appropriate points in time based on the proximate date associated with a defined life event. For example, the financial institution may contact the customer prior to a date associated with a major purchase to determine if the purchase is still planned and if financing is necessary to undertake the major purchase. If the purchase is imminent and financing is necessary, the financial institution can offer products or services related to the major purchase and/or the financing of the major purchase. In another example, the financial institution may contact the customer prior to a date associated with the beginning of a family member's college education to determine if funding of the education is necessary and, if so, provide offers for products or services related to college education funding. The triggers in the customer profile 610 may prompt automated customer contact, such as automated telephone calls, automated electronic mail (i.e., e-mail), automated mailings or the like. In other embodiments, the triggers in the customer profile 610 may prompt manual customer contact, such as personal telephone calls, face-to-face contact or the like.

FIGS. 5-21 represent graphical user interfaces associated with one specific embodiment of the present invention. It should be noted that the illustrations shown and described in FIGS. 5-21 are not to be deemed limiting in any way, but rather, show and describe one embodiment for practicing the present invention.

FIGS. 5-7 depict a block diagram representation of a life event user interface 800 configured for inputting life events and the proximate date associated with the occurrence of each life event. The life event user interface 800 includes life event tags 810 that define a specific life event. A life event for the purposes of this invention may be any event in the life of a customer that is generally associated with a change in financial status, requires financing, and/or requires financial assessment/planning. Examples of life event tags shown in FIGS. 5-7 include a "home purchase"/own home tag 812, a "retirement" tag 814, a "have children" tag 816, a "college"/higher education tag 818, a "debt free" tag 820, a "move"/relocate tag 822, a "major purchase" tag 824, a "job change" tag 826, a "save money" tag 830 and other event tag 828. Although not shown in FIGS. 5-7, it is possible to configure the life interest user interface 800 such that the life event tags are scrollable, thereby allowing additional life event tags that define other life events to be displayed and selected by the customer.

The life event user interface 800 additionally includes a timeline 850. In the illustrated example of FIG. 5, the timeline 850 includes a plurality of timeline buckets 850 that represent a date or a range of dates. For example, FIGS. 5-7 depict a current timeline bucket 850A, a "within 2 years" timeline bucket 850B, a "within 5 years" timeline bucket 850C, a "within 10 years" timeline bucket 850D, a "within 20 years" timeline bucket 850E and a "within 40 years" timeline bucket 850F. Thus, the "within 2 years" timeline bucket 850B accounts for a two-year range, the "within 5 years" timeline bucket 850B accounts for a three-year range, the "within 10 years" timeline bucket 850B accounts for a five-year range, the "within 20 years" timeline bucket 850B accounts for a ten-year range, and the "within 40 years" timeline bucket 850B accounts for a 40-year range. The current timeline bucket 850A is for life events already achieved or life events currently ongoing.

As shown in FIG. 6, a user may move the life event tags from the life event tags 810 area to one of the timeline buckets 850. In doing so, the user has inputted a life event and defined an associated proximate date for the occurrence of the life event. Movement of the tags may be dictated by the form in which the user interface platform is presented. In one embodiment in which the user interface is presented on a conventional display, the life event tags 810 may be moved by mouse/pointer interaction through a click and drag function. In another embodiment in which the user interface is presented on a multi touch-screen display, the event tags 810 may be moved by appropriate finger motion, such as dragging an event tag toward a bucket or "flicking" an event tag toward a bucket. As shown in FIG. 6, the "own home" event tag 812 has been moved to the current timeline bucket 850A to signify a life event that has already occurred. Additionally, the "have children" event tag 816 and "debt free" event tag 818 have been moved to the "within 10 years" or 6-10 year range timeline bucket 850D. As event tags are moved to a timeline bucket, the bucket may expand in size to accommodate the size and/or volume of event tags in the timeline bucket. In this regard, the greater the number of event tags within a timeline bucket, the larger the perimeter of the timeline bucket.

In one embodiment of the life event user interface 800, a user may "point and click" or otherwise "tap and hold" an event tag once they are moved to a timeline bucket to provide for the display of a dropdown menu 860 that indicates the years within the range of the timeline bucket. The dropdown menu 860 allows the user to further define the specificity of the proximate date of occurrence of a life event, in instances in which the user can, and is willing to, provide such date granularity. Thus, if the current year is 2008 and the timeline bucket is the "within 10 years" or 6-10 year timeline bucket 850D, the dropdown menu 860 may reflect the years 2014, 2015, 2016, 2017 and 2018. As shown in FIG. 7, if the user selects a year from the dropdown menu 860, the year will be reflected in the event tag shown on the user interface and the year will define the proximate date of occurrence for the associated life event. By providing for further granularity within the timeline 850, such as specific years or the like, the customer experience system of the present invention is able to more closely align product/service recommendations and related offers to meet the needs of the customer. In addition, the customer profile that stores life events and the associated proximate date will reflect a more definitive date for the occurrence of the life event and, thus, triggers in the customer profile for contacting the customer will be more accurate in terms of the date of occurrence.

For example, in FIG. 7, the customer has chosen 2017 as the date 862 for which the customer desires to be debt-free. The date 862 is associated and displayed with the event tag and the timeline bucket may be re-sized to accommodate for the inclusion of the date within the event tag. During the life event evaluation process, if the customer desires to remove or change the year from an event, the customer may "point, click and drag" or "touch, drag and drop" the year portion of the event tag to accomplish removal of the date. A new date from within the date range of the timeline bucket may be added or the event tag may be moved to another timeline bucket within the user interface, if the customer deems necessary. Additionally, the same procedure may be used to remove an event tag from a timeline bucket. The user/customer may "point, click and drag" or "touch, drag and drop" the event tag to an area outside of the timeline bucket to remove the event from the timeline. Once the event has been removed from the timeline, it may re-appear in the life event tag 810 area.

FIGS. 8-9 depict a block diagram representation of a life interest user interface 900 configured for inputting life interests within the customer experience module, according to another embodiment of the present invention. The life interest user interface 900 includes a scrollable listing of life interest categories 910. Each category defines a life interest, for example, a charitable organization, a specific professional sports league, a particular college/university conference or the like. Scrolling of the life interest categories may be dictated by the type of platform on which the user interface is presented. For example, a conventional display may provide for "point, click and drag" movement of the life interest categories and a multi touch-screen display may provide for "touch and drag" or "flick" movement of the life interest categories. The life interest category 912 that is positioned in the center designation area corresponds to the listing of life interest items 920A-920H displayed below the life interest categories. For example, if the centered position life interest category is the National Basketball Association (NBA), the life interest items displayed may be logos or other identifying indicia representing NBA teams. In one aspect in which the life interest items display a logo or other identifying indicia, the item may be "clicked-on" or "touched and held" to display the name of the life interest item. The life interest items may be configured such that the list of the life interest items 920 are scrollable via arrow keys 930 to accommodate more life interest items than are viewable within the allotted life interest item area.

The life interest categories 910 may be arranged in alphabetical order or in any other suitable order. As such, life interest categories 914 positioned to the left of the center positioned life category 912 may reflect preceding alphabetically listed life interest categories, and life interest categories 916 positioned to the right of the center positioned life category 912 may reflect subsequent alphabetically listed life interest categories.

As shown in FIG. 9, a customer/user may move a life interest item 920 from the listing to the customer life interests area 940 to provide for a life interest input. In the illustrated example of FIG. 9, the customer/user has chosen/moved life interest items 920C and 920G into the customer life interests area 940. Moving of the life interest item into the customer's life interest area 940 may be dictated by the type of platform on which the user interface is presented. For example, a conventional display may provide for "point, click and drag" movement of the life interest item and a multi touch-screen display may provide for "touch and drag" or "flick" movement of the life interest item. If the customer desires to remove a life interest item from the customer life interests area 940, a "point, click and drag" or a "touch and drag/flick" movement of the item outside of the designated customer life interest area 940 will remove the item from the customer's designated listing.

FIGS. 10-14 depict a block diagram representation of a customer financial portfolio user interface 1000 configured for inputting financial portfolio information within the customer experience module, according to another embodiment of the present invention. The customer financial portfolio user interface 1000 includes a plurality of financial institution cards 1010, each card representing a financial institution. The cards may be arranged in alphabetical order such that the cards 1010A to the left of the center positioned card 1010B reflect the preceding alphabetically listed cards, and the cards 1010C to the right of the center positioned card 1010C reflect the subsequent alphabetically listed cards. The manner of movement of the financial institution cards 1010 may be dictated by the type of platform on which the user interface is presented. For example, a conventional display may provide for "point, click and drag" movement of the financial institution cards and a multi touch-screen display may provide for "touch and drag" or "flick" movement of the financial institution cards.

Figure 10:
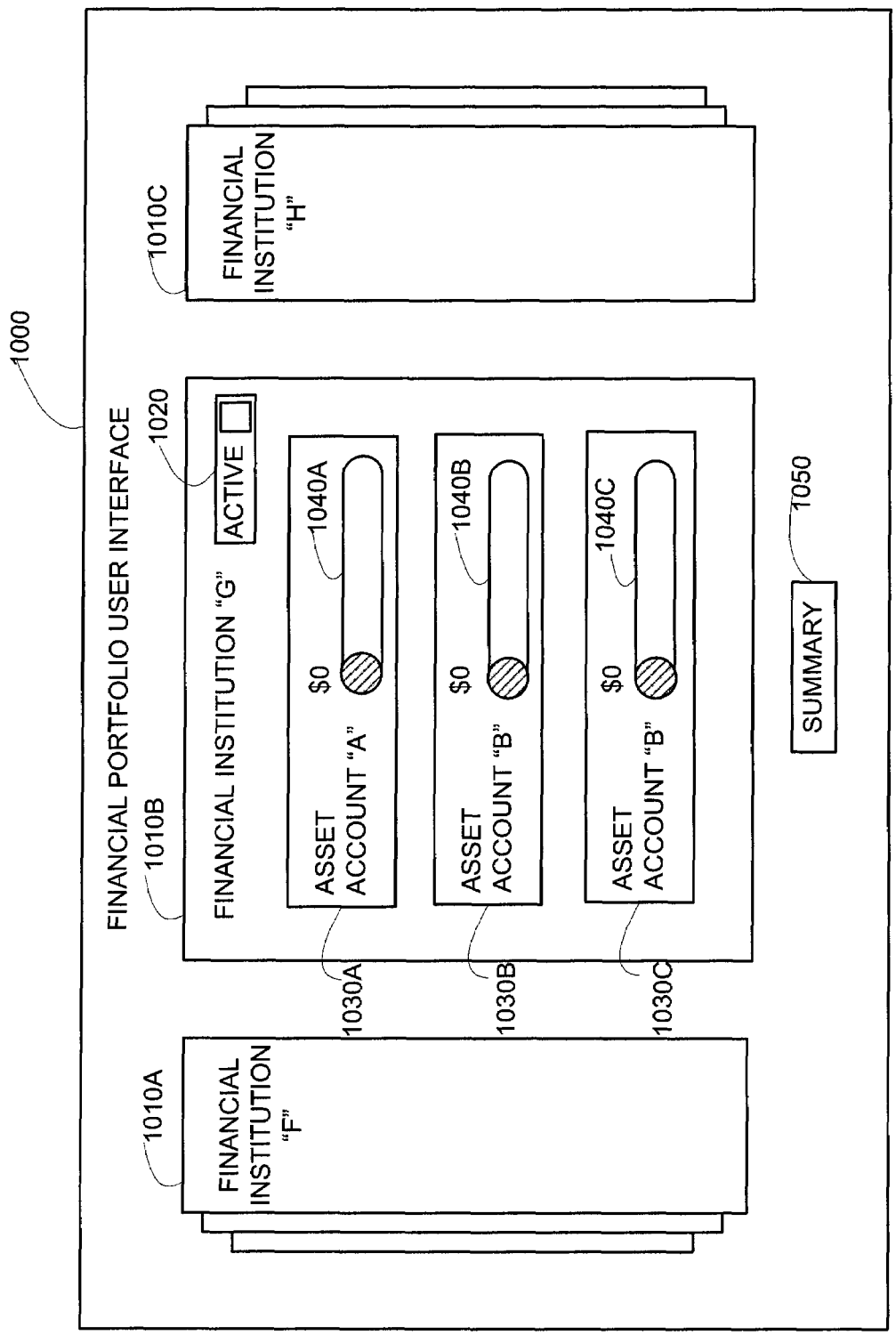
Figure 11:
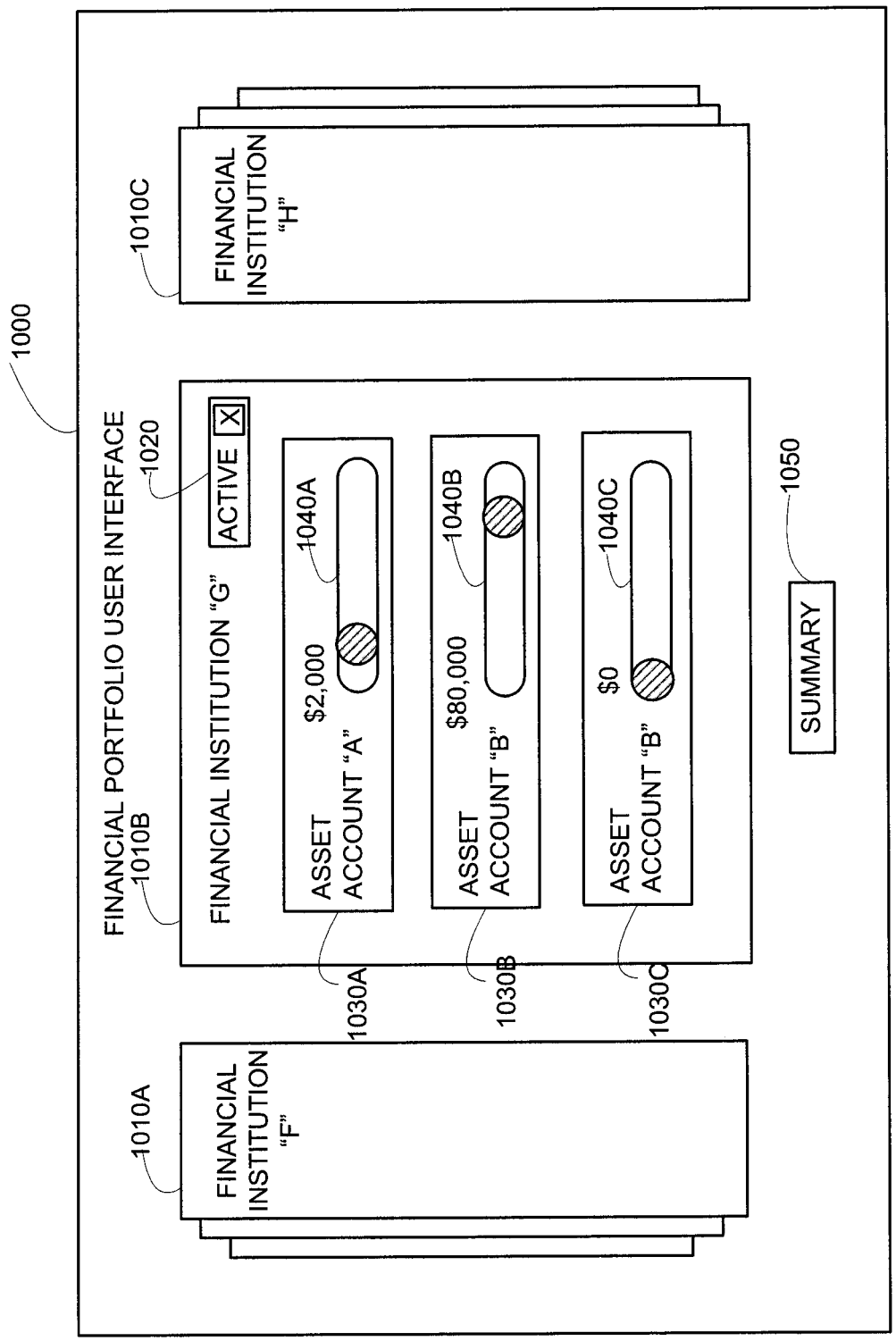

The center positioned financial institution card 1010B allows for the customer/user to designate the financial institution as one which the customer/user conducts business via the "active" indicator check box 1020. In certain instances the customer may be reluctant to provide any financial information beyond designating certain financial institutions as ones at which the customer conducts business. Additionally, the center positioned financial institution card 1010B provides for a listing of asset accounts 1030, such as asset account "A" 1030A, asset account "B" 1030B, and asset account "C" 1030C, which may correspond to a savings, checking, or investment account, or the like. Each asset account has a corresponding value entry mechanism 1040A, 1040B and 1040C, respectively, that are operable to provide for a value associated with the corresponding asset account. In the illustrated examples of FIGS. 10-14, the value entry mechanism is a sliding bar that allows the customer/user to define a proximate value for the account by sliding the bar to the appropriate position corresponding to the proximate value of the account. In FIG. 10, the value entry mechanism for all asset accounts reflects a value of zero prior to the customer/user inputting any account information into the financial institution card 1010B. Referring to FIG. 11, the financial portfolio user interface 1000 reflects a financial institution card 1010B in which the customer/user has made inputs to the value entry mechanisms 1040A and 1040B. Specifically, the value entry mechanism 1040A associated with asset account "A" 1030A reflects a value of $2,000 and the value entry mechanism associated with asset account "B" reflects a value of $80,000. It should be noted that the increments of the sliding bar may be configured to provide for a suitable range of account value. In addition, the check box 1020 may be configured to automatically update to the active status if one of the value entry mechanisms are engaged by the customer/user.

Figure 12:
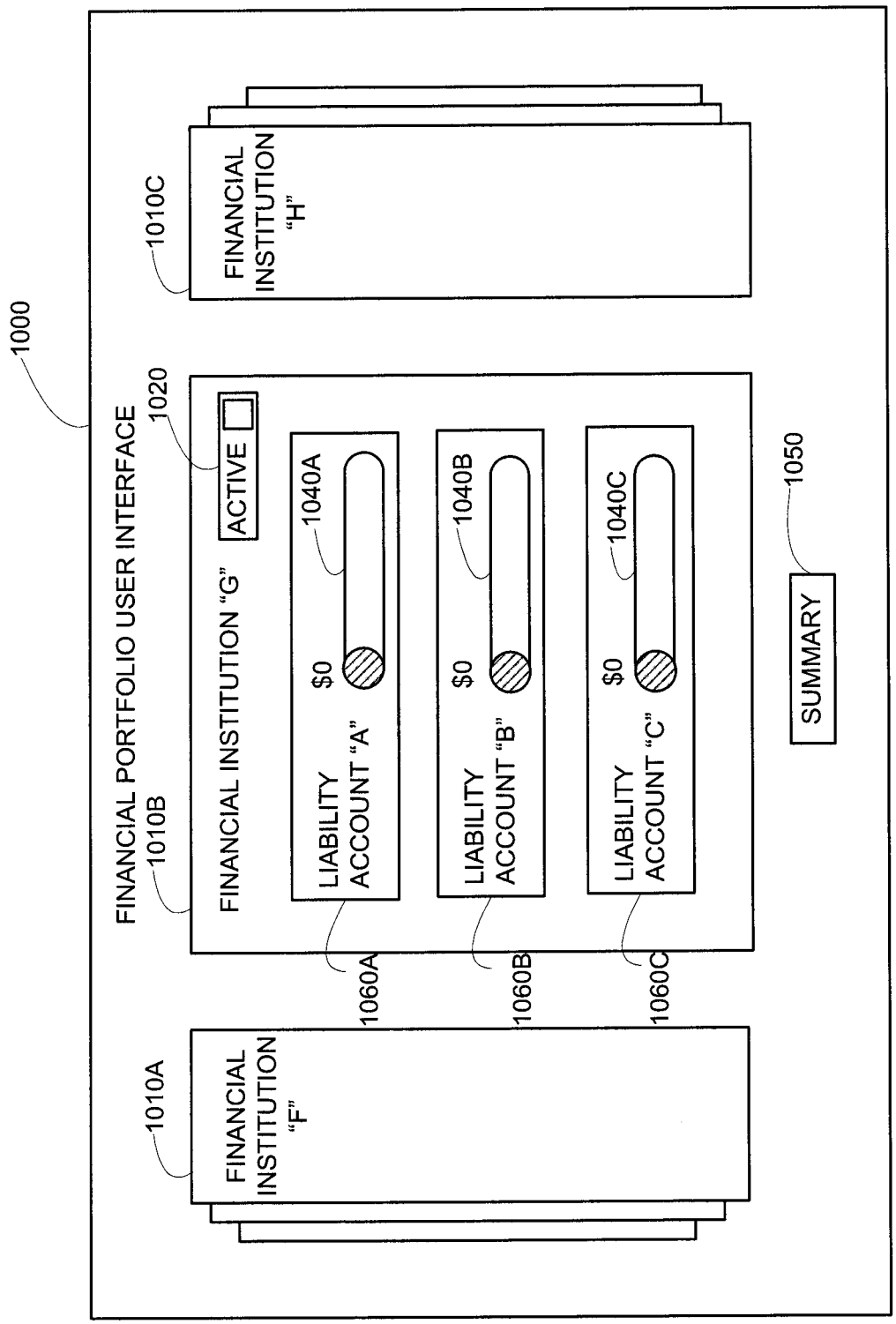

According to one aspect, the financial institution cards 1010 of financial portfolio user interface 1000 may be configured to be flipped on the y-axis to provide for display of the reverse side of the financial institution card 1010. The reverse side of the financial institution card 1010 includes information pertaining to the liability or debt accounts associated with the financial institution. Flipping the card to the reverse side may be accomplished by a "point and click" input on the card or a "tap" input on the card, depending on the platform used to present the user interface. FIG. 12 provides an example of financial institution card 1010B that has been flipped to the reverse side so as to display the liability/debt accounts, such as liability account "A" 1060A, liability account "B" 1060B and liability account "C" 1060C. The liability accounts may include, but are not limited to, home mortgage accounts, other loan accounts, credit card accounts and the like. Similar to the asset account, the liability accounts include a value input mechanism 1040A, 1040B and 1040C, such as a sliding bar or the like for inputting the value of the liability accounts.

Figure 13:
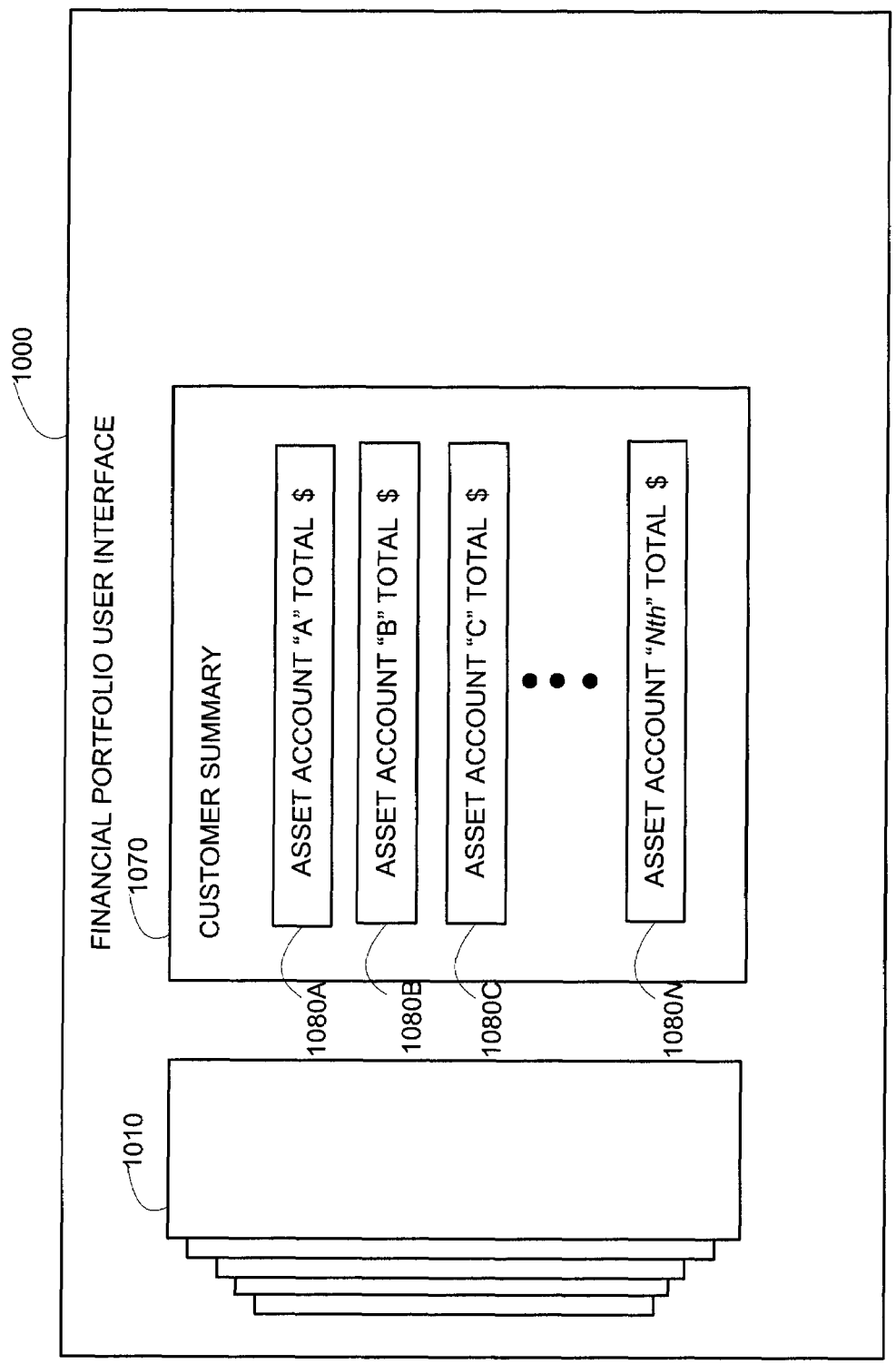
Figure 14:
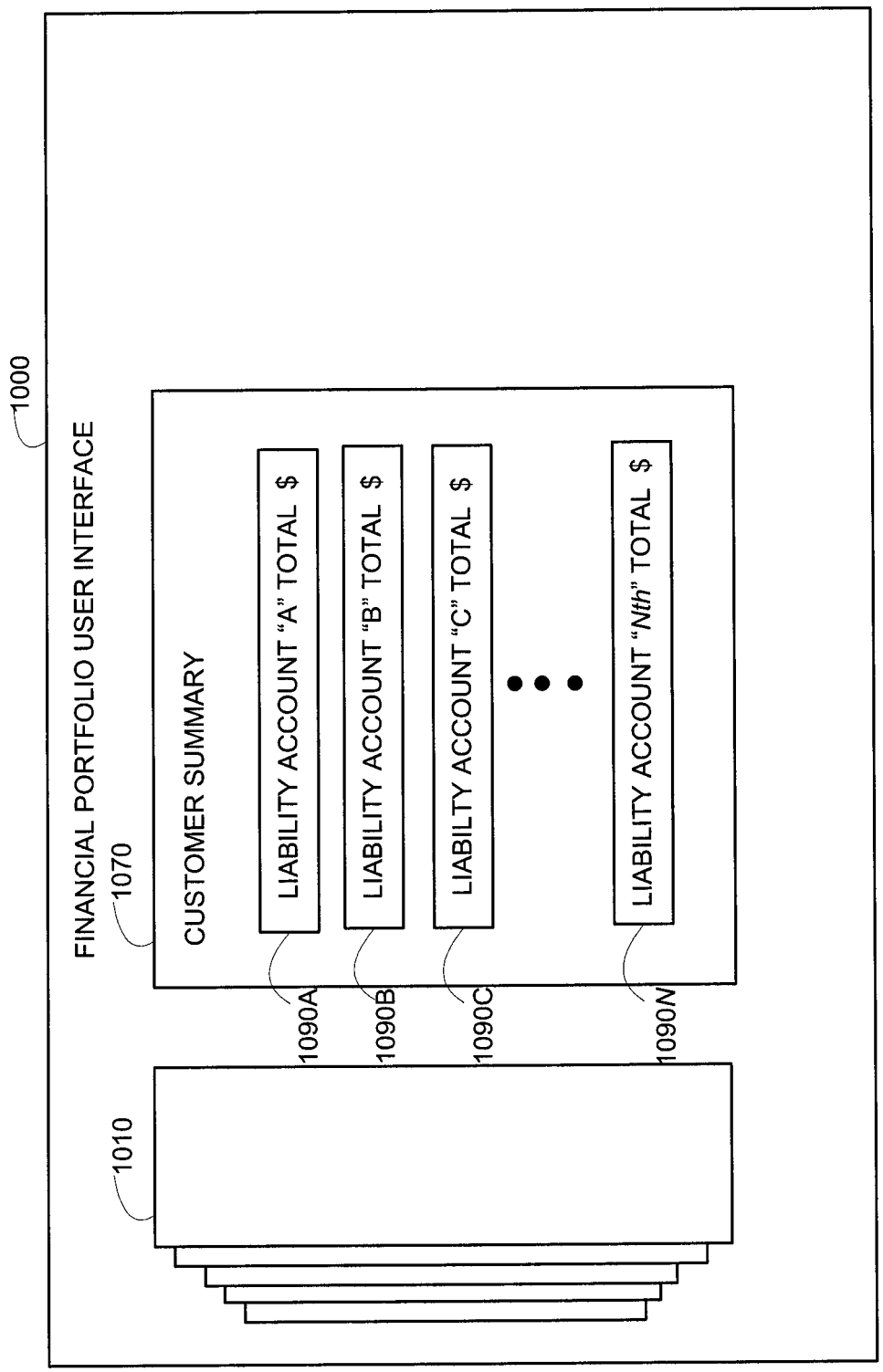

FIGS. 10-12 also reflect a summary key 1050 that, upon engaging, provides for display of a financial summary card that reflects the inputted totals for all asset and liability accounts. In addition to being accessible via the summary key 1050, the financial summary card may be configured as the last card in the ordered plurality of financial institution cards, such that scrolling all the cards from right to left also results in the display of the financial summary card. FIGS. 13-14 provide an example of the financial summary card 1070. As described, the financial summary card may be configured as the last card in the stack of financial institution cards and thus, all of the financial institution cards 1010 are shown to the left of the financial summary card 1070 in the display. The financial summary card 1070 may be configured similar to the financial institution cards, such that asset account totals are shown on the front side of the card and the liability/debt account totals are shown on the reverse side of the card. FIG. 13 reflects the asset totals for each individual asset account type, such as asset account "A" total 1080A, asset account "B" total 1080B, asset account "C" total 1080C and asset account "Nth" total where N is the last asset account type. The card may be flipped to the reverse side by a "point and click" input on the card or a "tap" input on the card, depending on the platform used to present the user interface. FIG. 14 reflects the liability totals for each individual liability/debt account type, such as liability account "A" total 1090A, liability account "B" total 1090B, liability account "C" total 1090C and liability account "Nth" total where N is the last liability account type.

Referring to FIGS. 15-16, block diagram representations of a financial product recommendation and customization user interface 1100 are shown, according to another embodiment of the present invention. The financial product recommendation and selection user interface 1100 includes a financial products area 1110 for displaying one or more financial products. In the illustrated aspect of FIG. 15, upon initially accessing the financial product recommendation and selection user interface 1100, the financial products area 1110 may display the financial product recommendations. As previously noted, the product recommendations may be based at least in part on the life events and associated proximate dates of occurrence and, in some embodiments, the life interests of the customer and the financial portfolio information of the customer. In the illustrated embodiment of FIG. 15, the financial products area 1110 includes recommendations for a category "B" affinity financial product 1112, such as an affinity credit card or the like, a category "C" financial product 1114, such as a checking account or the like and a category "D" financial product 1116, such as a protective service or the like. In addition, the category "B" affinity product has a pre-approval identifier 1118 operable to identify the product as one having requisite customer pre-approval. In addition, the financial products area 1110, the financial product recommendation and selection user interface 1100 may include a financial product option area 1120 operable for displaying other financial product options that may be offered to the customer.

As shown in FIG. 16, the other financial product options may be displayed by activating one of the financial product categories displayed along the periphery of the financial product option area 1120. As shown, the categories may include financial product category "A" 1122, financial product category "B" 1124, financial product category "C" 1126, financial product category "D" 1128, financial product category "E" 1130, and financial product category "F" 1132. In the illustrated aspect of FIG. 16, financial product category "E" has been activated (as indicated by the bold-faced type) to display the category "E" financial product options 1134 available to the customer in the financial product option area 1120. It should be noted that the financial product options available to a customer may be, but are not required to be, based at least in part on the life event data, the life interest data and/or the financial portfolio data.

As a means of customizing a financial product package, the customer/user may move financial products into or out of the financial product area 1120 to formulate a package. Financial products may be moved into the financial product area 1120 from the financial product option area 1120 by a "point, click, drag and drop" movement or a "touch and drag" movement, depending on the user interface platform implemented. Financial products may be moved out of the financial product area 1120 to remove the product from the potential financial product package.

In addition to the financial product area 1110 and the financial product option area 1120, the financial product recommendation and selection user interface 1100 may include a timeline display 1140 operable to provide quick access to the timeline buckets and associated life events in the life event user interface 800. In this regard, the customer and financial institution associate have viewable access to the previously inputted life events and associated proximate date, so as to rely on this information while configuring a financial product package.

The dollar sign key 1150 in the financial product area 1110 allows for the financial product package to be priced at any point in time as financial products are moved into and out of the financial product area 1120. Engagement of the dollar sign key 1150 will change the display of the key to reflect the dollar value of the package.

FIG. 17 reflects a block diagram of the detail view of a financial product as accessible from the financial product area 1110 or the financial product option area 1120 of the financial product recommendation and selection user interface 1100. In the illustrated example, the category "B" affinity financial product 1112 displayed in the financial product area 1110 has been engaged, such as by "tap" motion or "point and click" motion, depending on the user interface platform, to display the detailed view of FIG. 17. The detailed view may include, but is not limited to, product details 1200, optional pre-approval details 1202, if the customer qualifies for pre-approval, optional offers 1204 related to the financial product, if the customer qualifies for any offers and, in this particular example because the financial product is an affinity product, an option to change the affinity 1206.

If the customer chooses the change affinity option 1206, a listing of affinity options for the affinity product may be displayed in the user interface. An example of such a display is shown in the block diagram of FIG. 18. The affinity options presented in the display may correspond to life interests defined by the customer in the life interest user interface 900 and are available for the recommended or chosen affinity financial product. In the illustrated example, three additional affinity options are provided to the customer, affinity option "A" 1300, affinity option "B" 1302 and affinity option "C" 1304, each option having a corresponding check box 1306 operable to activate/de-activate an affinity. Additionally, an option to remove the affinity 1308 from the product altogether may be provided.

Referring to FIG. 19, is another block diagram of the detail view of a financial product as accessible from the financial product area 1110 or the financial product option area 1120 of the financial product recommendation and selection user interface 1100. The detailed view highlights product options available for a category "C" financial product 1114 depicted in the financial product area 1110.

In the illustrated example, the category "C" financial product 1114 displayed in the financial product area 1110 has been engaged, such as by "tap" motion or "point and click" motion, depending on the user interface platform, to display the detailed view of FIG. 19. The detailed view may include, but is not limited to, product options such as category "C" first product option 1400, category "C" second product option 1402, category "C" third product option 1404 and category "C" Nth product option where N is the last product option. Each product option has a check box 1410 associated with the option to activate/deactivate the option. For example, if the category "C" product is online banking, the options may include mobile banking, bill pay, or any other options. In addition some of the options may have a multi-media presentation associated with the option that may be presented to the customer by activating the video icon or other presentation icon identifier key 1420. In addition to category "C" options, the detailed view may provide for access to one or more tutorials, such as a category "C" product tutorial 1430 that explains the financial product, or a category "C" option tutorial 1432 that explains the financial product options.

Referring to FIG. 20, a block diagram is depicted of the comparison feature of the financial product recommendation and selection user interface 1110. At any point in time while customizing the financial products in the financial product area 1110, the customer may engage the comparison key 1160 to display a comparison between the currently configured financial product package and comparison financial products displayed in the comparison financial products area 1190. The comparison financial products 1190 may be configured to be equivalent to the initially displayed recommended financial products or the comparison financial products 1190 may be based on financial product packages purchased by other customers having similar demographics/life events/life interests and/or financial portfolios. In the illustrated example shown in FIG. 20, the comparison financial products area 1190 highlights a category "A" financial product 1119 that differs from the products that the customer has customized in the financial product area 1110. The customer may further compare the customized financial product package to the comparison financial product package by engaging the dollar sign key 1150 to provide for a pricing for the customized package and/or the comparison package.

Once the customer has finalized their respective customized financial product package, the customer may engage the end key 1170 shown in FIGS. 15, 16 and 20 to complete the process and fulfill the package. Referring to FIG. 21, a representative block diagram is shown of a financial product fulfillment user interface 1500 that is operable to be displayed upon completion of the customization process. The financial product fulfillment user interface 1500 may include a print checks option 1502 to instantaneously print checks according to the customer's requirements, a print credit card 1504 option to instantaneously print and laminate a credit card/debit card per the customer's requirements and a send financial product summary package option 1506 that automatically configures and sends via email, postal mail or the like the summary information pertaining to the customized and chosen financial product package.

Referring to FIGS. 22-28, block diagram representations of an alternative financial product recommendation and customization user interface 1600 are shown, according to another embodiment of the present invention. The financial product recommendation and selection user interface 1100 includes a financial products area 1610 for displaying one or more financial products. The financial products area 1610 includes a category selector 1612 operable for selecting amongst a plurality of financial product categories. In the illustrated examples of FIGS. 22-28 the financial product categories include "use money", "save money" and "manage money", although in other embodiments of the invention other financial product categories may be implemented or omitted. The category selector 1612 may be clickable, scrollable or the like as the operative means to display other financial product categories. Selection of a financial product category will, in turn, display one or more financial product sub-categories. For example, in the illustrated embodiment of FIG. 22, selection/display of the "use money" financial product category may display four financial product sub-categories: financial product sub-category "A" 1614; financial product sub-category "B" 1616; financial product sub-category "C" 1618; and financial product sub-category "D" 1620. For example, in the "use money" financial product category the four sub-categories may correspond to checking accounts; check cards; credit cards, online banking or the like.

Selection of a financial product sub-category, such as by touching, clicking or otherwise the respective financial product sub-category icon is operable to display one or more sub-category financial products in the financial product area 1610. In the illustrated example of FIG. 22, financial product sub-category "A" 1614 has been selected, as illustrated by the bold-faced text and the financial product area 1610 depicts three sub-category "A" products 1622, 1624 and 1626. For example, if financial product sub-category "A" 1614 is checking accounts, the sub-category "A" products 1622, 1624 and 1626 may correspond to three different checking account options. It should be noted that the sub-category products displayed, and otherwise offered to the customer, are based at least on the life events defined by the customer and, in some embodiments of the invention, the life interests and/or financial interests of the customer. For example, if the customer has identified a certain life interest, such as a professional sports team, the checking account offers that are displayed may be affinity checking account offers associated with the chosen professional sports team. As previously described, each sub-category product may be "touched", "clicked-on" or otherwise activated to display the features, benefits, fees or the like associated with that particular financial product.

In addition, the financial product recommendation and selection user interface 1600 of FIG. 22 includes a first category financial product selection area 1630. In the illustrated example of FIG. 22 the first category financial product selection area 1630 corresponds to the "use money" category. FIG. 23 depicts the financial product recommendation and selection user interface 1600 in which the user has completed selection of sub-category financial products from all of the financial product sub-categories within the "use money" category. Thus, financial product sub-category "D" 1620 is highlighted and the financial product area 1620 reflects corresponding sub-category "D" financial products 1627 and 1629. The financial product 1620 originally displayed sub-category "D" financial product 1636, but that product has been selected and moved to the customer's first category financial product selection area 1630.

The first category financial product selection area 1630 reflects the customer selected/configured financial products associated with the first category. As such, the first category financial product selection area 1630 reflects three different sub-category financial products: sub-category "A" financial product 1632; sub-category "C" financial product 1634 and sub-category "D" financial product 1636. The sub-category financial products may be "tapped/clicked and dragged" or otherwise moved to the first category financial product selection area 1630.

In the illustrated embodiment of FIG. 24, the "save money" financial product category has been selected by the user from category selector 1612 to display two financial product sub-categories: financial product sub-category "A" 1640; and financial product sub-category "B" 1642. For example, in the "save money" financial product category the two sub-categories may correspond to savings accounts; investment accounts or the like. In the illustrated example of FIG. 24, financial product sub-category "A" 1640 has been selected, as illustrated by the bold-faced text and the financial product area 1610 depicts five sub-category "A" products 1644, 1646, 1648, 1650 and 1652. For example, if financial product sub-category "A" 1640 is savings accounts, the sub-category "A" products 1644, 1646, 1648, 1650 and 1652 may correspond to five different savings account options.

In addition, the financial product recommendation and selection user interface 1600 of FIG. 24 includes a second category financial product selection area 1660. In the illustrated example of FIG. 24 the second category financial product selection area 1660 corresponds to the "save money" category. FIG. 25 depicts the financial product recommendation and selection user interface 1600 in which the user has completed selection of sub-category financial products from all of the financial product sub-categories within the "save money" category. Thus, financial product sub-category "B" 1642 is highlighted and the financial product area 1620 reflects corresponding sub-category "B" financial products 1643, 1645, 1647, 1649 and 1651. The financial product 1620 originally displayed sub-category "B" financial product 1668, but that product has been selected and moved to the customer's second category financial product selection area 1660.

The second category financial product selection area 1660 reflects the customer selected/configured financial products associated with the second category. As such, the second category financial product selection area 1660 reflects four different sub-category financial products: first sub-category "A" financial product 1662; second sub-category "A" financial product 1664, third sub-category "A" financial product 1666 and sub-category "B" financial product 1668.

In the illustrated embodiment of FIG. 26, the "manage money" financial product category has been selected by the user from the category selector 1612 to display three financial product sub-categories: financial product sub-category "A" 1670; financial product sub-category "B" 1672 and financial product sub-category "C" 1674. For example, in the "manage money" financial product category the three sub-categories may correspond to mortgage/home equity accounts; loan accounts, protective services or the like. In the illustrated example of FIG. 26, financial product sub-category "A" 1670 has been selected, as illustrated by the bold-faced text and the financial product area 1610 depicts two sub-category "A" products 1676 and 1678. For example, if financial product sub-category "A" 1640 is mortgage/home equity accounts, the sub-category "A" products 1674 and 1676 may correspond to a mortgage options and/or home equity options.

In addition, the financial product recommendation and selection user interface 1600 of FIG. 26 includes a third category financial product selection area 1680. In the illustrated example of FIG. 26 the third category financial product selection area 1680 corresponds to the "manage money" category. FIG. 27 25 depicts the financial product recommendation and selection user interface 1600 in which the user has completed selection of sub-category financial products from all of the financial product sub-categories within the "manage money" category. Thus, financial product sub-category "C" 1674 is highlighted and the financial product area 1620 reflects corresponding sub-category "C" financial products 1675, 1677 and 1679. The financial product 1620 originally displayed sub-category "C" financial product 1684, but that product has been selected and moved to the customer's third category financial product selection area 1680.

The third category financial product selection area 1680 reflects the customer selected/configured financial products associated with the third category. As such, the third category financial product selection area 1680 reflects two different sub-category financial products: sub-category "A" financial product 1682 and sub-category "C" financial product 1684.

Additionally, FIG. 27 illustrates a price point key 1686 for pricing the financial product package that the user has assembled/configured. It should be noted that the price point key 1686 may be displayed and activated throughout the configuration process to assess the price of the financial product package at any point in time. Activation of the key 1686 may correspond to display of the price in lieu of display of the dollar sign. FIG. 27 also includes a comparison key 1688 that is operable, upon activation, of displaying a comparative data. Comparative data is illustrative of what other customer's having similar demographics have chosen as their financial product package in the past. The similar demographic data is based at least in part on the defined life events and, in some embodiments, the defined life interests and the defined financial interests (i.e., assets and liabilities). The done/end key 1689, upon activation, finalizes the financial product package and may lead to the display of a product fulfillment user interface, such as the one depicted and described in relation to FIG. 21.

FIG. 28 depicts an example of the financial product recommendation and selection user interface 1600 in which the comparison data is depicted, in accordance with another embodiment of the present invention. The right-hand side of the user interface 1600 displays the previously configured/selected customer choices for their respective financial package. The left-hand side of the user interface 1600 displays, upon activation of, comparison key 1688, the comparative data 1690. The comparative data 1690 displays the financial products generally chosen by someone having similar demographics. For example, in the illustrated example of FIG. 28, the comparative data 1690 shows that similarly situated customer has a financial product package that includes in the first financial product category 1700, referred to as the "use money" category", four sub-category products: sub-category "A" financial product 1702; sub-category "B" financial product 1704; sub-category "C" financial product 1706 and sub-category "D" financial product 1708. In the second financial product category 1710, referred to as the "save money" category", four sub-category products: first sub-category "A" financial product 1712; second sub-category "B" financial product 1714; first sub-category "B" financial product 1716 and second sub-category "B" financial product 1718. In the third financial product category 1720, referred to as the "manage money" category", three sub-category products: sub-category "A" financial product 1722; sub-category "B" financial product 1724; and sub-category "C" financial product 1726. The user/customer has the option of selecting one or more of the financial products in the comparison data 1690 for inclusion in their respective financial product package. In one embodiment, the user may "click/point and drag" the icon associated with the sub-category product from the comparative data 1690 side to the customer's configured financial product package to consider or re-configure their package. Financial products that the customer no longer desires in their package, for example a product being replaced by a similar product in the comparative data 1690, may be removed by dragging the associated icon to an area outside of the financial product category areas.

FIG. 29 provides for a flow diagram of a method 1800 for providing a financial customer experience on a computing device. At Event 1810, a first user interface is provided that is operable to receive first user inputs that define a customer's life events and associate each life event with a proximate date of occurrence. In one optional embodiment of the method, providing the first user interface further includes configuring the first user interface with a timeline such that tags representing life events are movable to different locations within the timeline to represent the proximate date of the occurrence of the life event.

At Event 1820, a second user interface is provided that is operable to receive second user inputs that define the customer's life interests. In optional embodiments of the method, providing the second user interface further includes configuring the second user interface with a catalog of life interest categories, such that selection of a life interest category provides for display of one or more associated life interest items and selection of one or more life interest items defines a customer's life interests.

At Event 1830, a third user interface is provided that is operable to receive third user inputs that define the customer's financial portfolio. In optional embodiments of the method, providing the third user interface further includes providing the third user interface further includes configuring the third user interface with a catalog of financial institutions cards. Each financial institution card provides for the customer to define proximate values of asset accounts and liability accounts associated with a financial institution.

At Event 1840, a fourth user interface is provided that is operable to present financial product recommendations based on at least one of the first, second or third user inputs. Additionally, the fourth user interface is operable to receive fourth user inputs that customize a customer's selection of one or more financial products based on the recommendations and one or more financial product options. In optional embodiments of the method, providing the fourth user interface further includes configuring the fourth user interface to display the recommended financial products upon accessing the fourth user interface and providing for a plurality of financial product categories that are selectable to display the financial product options within the selected category. In still further optional embodiments, providing the fourth user interface further includes configuring the fourth user interface to provide for a plurality of financial product categories that are selectable to display financial product options and provide for a comparison option that displays selected financial product options versus the financial product recommendations.

At optional Event 1850, a fifth user interface is provided that is operable to present a financial product fulfillment display based on completing financial product choices associated with the fourth user interface. The fifth user interface is operable to receive fifth user inputs for initiating at least one of printing checks or printing a credit card.

FIG. 30 provides a flow diagram of a method 1900 for financial product/service re-assessment, in accordance with an embodiment of the present invention. At Event 1910, first data is captured that is related to one or more customer life events and an associated proximate data of occurrence for each of the life events. In one embodiment, the first data is captured via a financial customer experience module as detailed above. At Event 1920, the first data is stored in a profile associated with the customer.

In addition to capturing and storing first data, the method may optionally include the capture and storage of second data that is related to the customer's financial portfolio and/or third data that is related to the customer's life interests. In one embodiment, the second and third data may be captured via the financial customer experience module as detailed above.

At Event 1930, triggers are set in the customer profile that are operable to communicate an alert to a financial institution that a customer life event is imminent or occurring based on the stored proximate date of occurrence of the life events. At Event 1940, the customer is contacted based on receipt of the alert by the financial institution. The contact is for the purpose of re-assessing the customer's current financial products/services in view of the imminent or ongoing customer life event. The customer may be contacted automatically such as via email or postal mail or the contact may be a follow-up telephone call or face-to-face contact.

Thus, methods, systems, computer programs and the like have been disclosed that provide for an interactive financial customer experience for collaboratively selecting financial products for the customer. The collaborative nature of the financial customer experience provides the customer with more interaction and input to the selection of financial products than has previously been afforded the customer. By having the customer and the financial institution associate work together to make decisions regarding the financial products that are best suited for the customer, the customer has more ownership of the overall selection process and builds a trust relationship with the financial institution. Additionally, by assessing the customer's life events at the onset of the customer experience and subsequently using the life events and the proximate date of occurrence of the life events to determine financial product recommendations for the customer, the resulting financial product recommendations are much more tailored to the long-term needs of the customer.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A method for providing financial product recommendations on a computing device, the method comprising:
    providing, by a computing device processor, a first display of a life event user interface that includes a timeline and a plurality of life events;
    receiving, by a computing device, one or more first inputs that each choose one of the displayed life events and associate the chosen life event with a date range on the timeline, wherein the date range indicates a proximate date of occurrence for each of the life events to occur within a lifetime of a customer;
    providing, by a computing device processor, a second display of a life interest user interface that includes a plurality of customer life interest categories and customer life interest items within a chosen customer life interest category;
    receiving, by the computer device, one or more second inputs that each choose one of the displayed customer life interest items, wherein customer life interest items include at least one of an organization, an association, a school, or a sporting team to which the customer has an interest;
    determining, by a computing device processor, one or more financial product recommendations for the customer based at least in part on the life events, the proximate date of occurrence for each of the life events, and the customer life interest items; and
    providing, by a computing device, a third display of a financial product recommendation user interface that includes the one or more financial product recommendations,
    wherein at least one of the financial product recommendations are for an affinity financial product comprising one of an affinity credit card, an affinity debit card or an affinity checking account which represents at least one of the customer life interest on the face of the card or checks.

2. The method of claim 1, further comprising receiving, by a computing device, one or more third inputs that define information related to the customer's financial portfolio.

3. The method of claim 2, wherein determining the one or more financial product recommendations further comprises determining, by the computing device processor, the one or more financial product recommendations based at least in part on the life events, the associated proximate date of occurrence for each life event, the customer life interests and the information related to the customer's financial portfolio.

4. The method of claim 1, wherein providing the third display of the financial product recommendation on a user interface further comprises providing, by a computing device, the third display of the financial product recommendation user interface that further includes one or more additional financial product options.

5. The method of claim 4, further comprising receiving, by a computing device, one or more third inputs that customize the customer's selection of financial products based on the one or more financial product recommendations and the one or more financial product options.

6. The method of claim 1, wherein providing the third display of the financial product recommendation user interface further comprises providing, by a computing device processor, access to one or more networked multi-media demonstrations, each demonstration related to a financial product.

7. The method of claim 1, wherein providing the third display of the financial product recommendation user interface further comprises providing access to one or more networked tutorials, each tutorial related to at least one of a financial product or a financial product option.

8. The method of claim 1, further comprising storing, in a computing device memory, the life events associated with a customer and the proximate date of occurrence for each of the life events in a customer profile.

9. The method of claim 8, further comprising re-evaluating customer financial product needs over time based on the stored life events and proximate date of occurrence for each of the life events.

10. A system for providing financial product recommendations, the system comprising:
    a computing device including,
        a computing platform having at least one processor and a memory in communication with the processor, and
        a customer experience module stored in the memory and executable by the processor, wherein the customer experience module includes:
            a life events user interface routine operable to provide a first display of a life event user interface that includes a timeline and a plurality of life events and is operable to receive first inputs that each choose one of the displayed life events and associate the chosen life events with a date range on the timeline, wherein the date range indicates a proximate date of occurrence for each of the chosen life events to occur within a lifetime of a customer,
            a life interest user interface routine operable to provide a second display of a life interest user interface that includes a plurality of customer life interest categories and customer life interest items within a chosen customer life interest category and is operable to receive second inputs that each choose one of the displayed customer life interest items, wherein customer life interest items include at least one of an organization, an association, a school, or a sporting team to which the customer has an interest, and a financial product recommendation user interface routine operable to provide a third display of a financial product recommendation user interface that includes one or more; and a customer financial product recommendation module in communication with the customer experience module, wherein the customer financial product recommendation module is operable to determine the one or more financial product recommendations based at least in part on the inputted life events, the proximate date of occurrence for each of the chosen life events, and the customer life interest items, and communicate the financial product recommendations to the financial product recommendation user interface routine, wherein at least one of the financial product recommendations are for an affinity financial product comprising one of an affinity credit card, an affinity debit card or an affinity checking account which represents at least one of the customer life interest on the face of the card or checks.

11. The system of claim 10, wherein the customer experience module further comprises a financial portfolio user interface routine operable to provide a fourth display of a financial portfolio user interface that is operable to receive third inputs that define customer financial portfolio data.

12. The system of claim 11, wherein the customer financial product recommendation module is further operable to determine the one or more financial product recommendations based at least in part on the inputted life events, the proximate date of occurrence for each of the chosen life events, the customer life interest items and the customer financial portfolio data.

13. The system of claim 10, further comprising a customer database that stores a plurality of customer profiles, wherein the database is operable to receive the life events and the proximate date of occurrence for each of the chosen life events from the customer experience module and store the life events and proximate date of occurrence for each of the chosen life events in an associated customer profile.

14. The system of claim 10, wherein the financial product recommendation user interface routine is further defined as a financial product recommendation and customization user interface routine operable to provide the third display of a financial product recommendation and customization user interface that is further operable to provide the user an ability to customize a financial product package that includes one or more financial products.

15. The system of claim 10, wherein the financial product recommendation user interface routine is further operable to provide the third display of the financial product recommendation user interface that is further operable to provide access to at least one of multimedia demonstrations related to financial products or tutorials related to at least one financial products or financial product options.

16. A computer program product, comprising:
a non-transitory computer-readable medium comprising:

a first set of codes for causing a computer to provide a display of a life event user interface that includes a timeline and a plurality of life events;

a second set of codes for causing a computer to receive first inputs that each choose one of the displayed life events and associate the chosen life event with a date range on the timeline, wherein the date range indicates a proximate date of occurrence for each of the life events to occur within a lifetime of a customer;

a third set of codes for causing a computer to provide a second display of a life interest user interface that includes a plurality of customer life interest categories and customer life interest items within a chosen customer life interest category;

a fourth set of codes for causing a computer to receive one or more second inputs that each choose one of the displayed customer life interest items, wherein customer life interest items include at least one of an organization, an association, a school, or a sporting team to which the customer has an interest;

a fifth set of codes for causing a computer to determine one or more financial product recommendations for the customer based at least in part on the life events, the proximate date of occurrence for each of the life events, and the customer life interest items; and a sixth set of codes for causing a computer to provide a third display of a financial product recommendation user interface that includes the one or more financial product recommendations, wherein at least one of the financial product recommendations are for an affinity financial product comprising one of an affinity credit card, an affinity debit card or an affinity checking account which represents at least one of the customer life interest on the face of the card or checks.

17. The computer program product of claim 16, further comprising a seventh set of codes for causing a computer to receive one or more third inputs that define information related to the customer's financial portfolio.

18. The computer program product of claim 17, wherein the fifth set of codes is further defined as a third set of codes for causing a computer to determine the one or more financial product recommendations based at least in part on the life events, the proximate date of occurrence for each life event, the customer life interest items and the information related to the customer's financial portfolio.

19. The computer program product of claim 16, wherein the sixth set of codes is further configured for causing the computer to provide the third display of the financial product recommendation user interface that includes one or more additional financial product options.

20. The computer program product of claim 19, further comprising a seventh set of codes for causing a computer to receive one or more third inputs that customize a customer selection of financial products based on the one or more financial product recommendations and the one or more additional financial product options.

21. The computer program product of claim 16, wherein the sixth set of codes is further configured for causing the computer to provide access to at least one of networked multimedia demonstrations or networked tutorials that are related to the financial products of interest.

* * * * *